(12) United States Patent
Nash et al.

(10) Patent No.: US 12,462,333 B2
(45) Date of Patent: Nov. 4, 2025

(54) SYSTEMS AND METHODS FOR FUSING IMAGES

(71) Applicant: QUALCOMM Incorporated, San Diego, CA (US)

(72) Inventors: James Wilson Nash, San Diego, CA (US); Kalin Mitkov Atanassov, San Diego, CA (US); Sergiu Radu Goma, Sedona, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/463,179

(22) Filed: Sep. 7, 2023

(65) Prior Publication Data
US 2023/0419437 A1    Dec. 28, 2023

Related U.S. Application Data

(63) Continuation of application No. 16/375,795, filed on Apr. 4, 2019, now Pat. No. 11,790,481, which is a
(Continued)

(51) Int. Cl.
*G06T 3/053*    (2024.01)
*G06F 18/22*    (2023.01)
(Continued)

(52) U.S. Cl.
CPC ............ *G06T 3/053* (2024.01); *G06F 18/22* (2023.01); *G06T 3/4038* (2013.01); *G06T 5/20* (2013.01);
(Continued)

(58) Field of Classification Search
CPC ........... G06F 18/22; G06T 2207/10016; G06T 2207/20004; G06T 2207/20221;
(Continued)

(56) References Cited

U.S. PATENT DOCUMENTS 6,545,685 B1 *  4/2003  Dorbie ................ H04N 9/3147
                                                            348/383
7,009,638 B2     3/2006  Gruber et al.
(Continued)

FOREIGN PATENT DOCUMENTS

CN    103152518 A    6/2013
CN    105141807 A    12/2015
(Continued)

OTHER PUBLICATIONS

Atanassov K., et al., "Temporal Image Stacking for Noise Reduction and Dynamic Range Improvement", Proceedings Optical Diagnostics of Living Cells II, vol. 8667, Feb. 26, 2013, 86671P, 11 pages, XP055417957, ISSN: 0277-786X, DOI: 10.1117/12.2008559, ISBN: 978-1-5106-1354-6.
(Continued)

*Primary Examiner* — Kenny A Cese
(74) *Attorney, Agent, or Firm* — QUALCOMM Incorporated

(57) ABSTRACT

A method performed by an electronic device is described. The method includes obtaining a first image from a first camera, the first camera having a first focal length and a first field of view. The method also includes obtaining a second image from a second camera, the second camera having a second focal length and a second field of view disposed within the first field of view. The method further includes aligning at least a portion of the first image and at least a portion of the second image to produce aligned images. The method additionally includes fusing the aligned images based on a diffusion kernel to produce a fused image. The diffusion kernel indicates a threshold level over a gray level range. The method also includes outputting the fused image. The method may be performed for each of a plurality of frames of a video feed.

20 Claims, 17 Drawing Sheets

Related U.S. Application Data continuation of application No. 15/498,905, filed on Apr. 27, 2017, now Pat. No. 10,297,034.

(60) Provisional application No. 62/402,182, filed on Sep. 30, 2016.

(51) Int. Cl.

| | | |
|---|---|---|
| *G06T 3/4038* | (2024.01) | |
| *G06T 5/20* | (2006.01) | |
| *G06T 5/50* | (2006.01) | |
| *G06T 5/70* | (2024.01) | |
| *G06T 7/11* | (2017.01) | |
| *G06T 7/30* | (2017.01) | |
| *H04N 5/262* | (2006.01) | |
| *H04N 9/76* | (2006.01) | |
| *H04N 23/45* | (2023.01) | |
| *H04N 23/698* | (2023.01) | |
| *H04N 23/81* | (2023.01) | |
| *H04N 23/951* | (2023.01) | |
| *H04N 25/60* | (2023.01) | |
| *H04N 23/58* | (2023.01) | |

(52) U.S. Cl.
CPC .................. *G06T 5/50* (2013.01); *G06T 5/70* (2024.01); *G06T 7/11* (2017.01); *G06T 7/30* (2017.01); *H04N 5/2621* (2013.01); *H04N 9/76* (2013.01); *H04N 23/45* (2023.01); *H04N 23/698* (2023.01); *H04N 23/81* (2023.01); *H04N 23/951* (2023.01); *H04N 25/60* (2023.01); *G06T 2207/10016* (2013.01); *G06T 2207/20004* (2013.01); *G06T 2207/20221* (2013.01); *H04N 23/58* (2023.01)

(58) Field of Classification Search
CPC ......... G06T 3/053; G06T 3/4038; G06T 5/20; G06T 5/50; G06T 5/70; G06T 7/11; G06T 7/30; H04N 23/45; H04N 23/58; H04N 23/698; H04N 23/81; H04N 23/951; H04N 25/60; H04N 5/2621; H04N 9/76
See application file for complete search history.

(56) References Cited

U.S. PATENT DOCUMENTS

| | | | |
|---|---|---|---|
| 7,305,180 B2 | 12/2007 | Labaziewicz et al. | |
| 8,526,779 B1 | 9/2013 | Simmons et al. | |
| 8,619,148 B1* | 12/2013 | Watts .................... | H04N 5/2621 348/222.1 |
| 8,664,579 B2 | 3/2014 | Olsen et al. | |
| 8,717,412 B2 | 5/2014 | Linder et al. | |
| 9,185,291 B1 | 11/2015 | Shabtay et al. | |
| 9,398,264 B2 | 7/2016 | Georgiev et al. | |
| 9,414,037 B1 | 8/2016 | Solh | |
| 10,297,034 B2 | 5/2019 | Nash et al. | |
| 11,509,837 B2 | 11/2022 | Liu et al. | |
| 2002/0180759 A1* | 12/2002 | Park .................... | H04N 9/8227 348/E7.086 |
| 2007/0083114 A1 | 4/2007 | Yang et al. | |
| 2008/0030592 A1 | 2/2008 | Border et al. | |
| 2008/0218611 A1 | 9/2008 | Parulski et al. | |
| 2008/0218613 A1* | 9/2008 | Janson .................... | H04N 23/683 348/262 |
| 2009/0073254 A1 | 3/2009 | Li et al. | |
| 2010/0238327 A1* | 9/2010 | Griffith .................. | H04N 23/69 348/240.99 |
| 2012/0026366 A1 | 2/2012 | Golan et al. | |
| 2013/0016186 A1 | 1/2013 | Atanassov et al. | |
| 2013/0169834 A1 | 7/2013 | Herz et al. | |
| 2014/0168444 A1 | 6/2014 | Bae et al. | |
| 2014/0313353 A1* | 10/2014 | Echigo ............... | H04N 1/00938 348/207.11 |
| 2015/0085174 A1 | 3/2015 | Shabtay et al. | |
| 2015/0145950 A1 | 5/2015 | Murphy et al. | |
| 2015/0189140 A1* | 7/2015 | Sutton .................... | H04N 23/80 348/340 |
| 2015/0207999 A1* | 7/2015 | Han ....................... | H04N 23/69 348/240.3 |
| 2015/0296154 A1* | 10/2015 | Laroia .................. | H04N 25/531 348/340 |
| 2016/0028949 A1* | 1/2016 | Lee ........................ | H04N 23/80 348/218.1 |
| 2016/0050351 A1* | 2/2016 | Lee ........................ | H04N 23/55 348/221.1 |
| 2016/0173883 A1* | 6/2016 | Lawrence ............ | H04N 19/117 348/46 |
| 2016/0309095 A1 | 10/2016 | Laroia et al. | |
| 2017/0041553 A1 | 2/2017 | Cao et al. | |
| 2017/0230585 A1 | 8/2017 | Nash et al. | |
| 2018/0070018 A1* | 3/2018 | Bian .................... | H04N 23/698 |
| 2018/0096487 A1 | 4/2018 | Nash et al. | |
| 2018/0183982 A1 | 6/2018 | Lee et al. | |
| 2018/0227505 A1* | 8/2018 | Baltz .................... | H04N 5/2621 |
| 2018/0278884 A1 | 9/2018 | Abe | |
| 2018/0315156 A1 | 11/2018 | Shin | |
| 2019/0122349 A1 | 4/2019 | Cohen et al. | |
| 2019/0236794 A1 | 8/2019 | Nash et al. | |
| 2020/0120284 A1 | 4/2020 | Kini et al. | |
| 2021/0360172 A1 | 11/2021 | Liu et al. | |

FOREIGN PATENT DOCUMENTS

| | | |
|---|---|---|
| CN | 105308947 A | 2/2016 |
| CN | 105491278 A | 4/2016 |
| CN | 105657237 A | 6/2016 |
| CN | 105681633 A | 6/2016 |
| CN | 106303258 A | 1/2017 |
| WO | 2012024830 A1 | 3/2012 |
| WO | 2014062481 | 4/2014 |
| WO | 2014199338 A2 | 12/2014 |

OTHER PUBLICATIONS

Co-pending U.S. Appl. No. 16/667,662, inventor Liu; Shizhong, filed on Oct. 29, 2019.

International Preliminary Report on Patentability—PCT/US2017/043769, The International Bureau of WIPO—Geneva, Switzerland, Apr. 11, 2019.

International Search Report and Written Opinion—PCT/US2017/043769—ISA/EPO—Nov. 6, 2017.

International Search Report and Written Opinion—PCT/US2021/027278—ISA/EPO—Jul. 1, 2021.

Kahraman F., et al., "Image Frame Fusion Using 3D Anisotropic Diffusion", 23rd International Symposium on Computer and Information Sciences, Oct. 27, 2008, pp. 1-6, XP031375516, DOI: 10.1109/ISCIS.2008.4717968.

Kumar B.K.S., "Image Fusion Based on Pixel Significance Using Cross Bilateral Filter", Signal, Image and Video Processing, vol. 9, No. 5, Oct. 5, 2013, pp. 1193-1204, XP055330239, ISSN: 1863-1703, DOI: 10.1007/s11760-013-0556-9.

Li S., et al., "Image Fusion With Guided Filtering", IEEE Transactions on Image Processing, vol. 22, No. 7, Jul. 1, 2013, pp. 2864-2875, XP011510936, ISSN: 1057-7149, DOI: 10.1109/TIP.2013.2244222.

Zitova B., et al., "Image registration methods: a survey," Image and Vision Computing, Oct. 2003, vol. 21, No. 11, pp. 977-1000.

Kylmamaa M., "Creating A Post-Processing Framework: Tips Tricks", Internet Citation, Oct. 3, 2006 (Oct. 3, 2006), XP001543462, 10 Pages.

Weickert J., et al., "Theoretical Foundations of Anisotropic Diffusion in Image Processing", Theoretical Foundations of Computer Vision, Computing Supplement 11, 1996, pp. 221-236, DOI: 10.1007/978-3-7091-6586-7_13, (Year: 2002).

(56) References Cited

OTHER PUBLICATIONS

European Search Report—EP24171445—Search Authority—The Hague—Oct. 7, 2024.

* cited by examiner

SYSTEMS AND METHODS FOR FUSING IMAGES

RELATED APPLICATIONS

This application is a continuation of U.S. patent application Ser. No. 16/375,795, filed Apr. 4, 2019, for "SYSTEMS AND METHODS FOR FUSING IMAGES," which is a continuation of U.S. patent application Ser. No. 15/498,905, filed Apr. 27, 2017, for "SYSTEMS AND METHODS FOR FUSING IMAGES," which claims priority to U.S. Provisional Patent Application Ser. No. 62/402,182, filed Sep. 30, 2016, for "SYSTEMS AND METHODS FOR FUSING IMAGES," all of which are assigned to the assignee hereof and hereby expressly incorporated by reference herein.

FIELD OF DISCLOSURE

The present disclosure relates generally to electronic devices. More specifically, the present disclosure relates to systems and methods for fusing images.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smart phone may capture and/or process still and/or video images. Processing images may demand a relatively large amount of time, memory, and energy resources. The resources demanded may vary in accordance with the complexity of the processing.

Some kinds of images may be limited in detail, while some kinds of images may be limited in view. As can be observed from this discussion, systems and methods that improve image processing may be beneficial.

SUMMARY

A method performed by an electronic device is described. The method includes, for each of a plurality of frames of a video feed, obtaining a first image from a first camera, the first camera having a first focal length and a first field of view. The method also includes, for each of the plurality of frames, obtaining a second image from a second camera, the second camera having a second focal length and a second field of view disposed within the first field of view. The method further includes, for each of the plurality of frames, aligning at least a portion of the first image and at least a portion of the second image to produce aligned images. The method additionally includes, for each of the plurality of frames, fusing the aligned images based on a diffusion kernel to produce a fused image. The diffusion kernel indicates a threshold level over a gray level range. The method also includes, for each of the plurality of frames, outputting the fused image.

Fusing the aligned images may be based on an averaging filter guided by reference image structure. The averaging filter may have an adaptive bandwidth based on contrast. The adaptive bandwidth may provide increasing averaging relative to decreasing contrast. Fusing the aligned images may include combining the aligned images in accordance with a weighting based on a photometric similarity measure between the aligned images. Combining the aligned images may include blending one or more pixel values of the aligned images.

Fusing the aligned images may include determining a photometric similarity measure. Fusing the aligned images may also include determining the diffusion kernel. Fusing the aligned images may further include blending the aligned images based on the photometric similarity measure and the diffusion kernel.

Fusing the aligned images may include compositing the aligned images within a region of interest. Compositing the aligned images may include determining a first composite region from the first image and a second composite region from the second image. Compositing the aligned images may also include performing seam blending between the first composite region and the second composite region. Compositing the aligned images may be performed in order to recover a region of interest based on replacing a portion of the region of interest that does not exist in the second image with at least a portion of the first image.

The first image and the second image may be captured concurrently. The first image and the second image may be captured at different times. The first image may be a wide-angle image and the second image may be a telephoto image.

An electronic device is also described. The electronic device includes a memory and a processor coupled to the memory. The processor is configured to, for each of a plurality of frames of a video feed, obtain a first image from a first camera, the first camera having a first focal length and a first field of view. The processor is also configured to, for each of the plurality of frames, obtain a second image from a second camera, the second camera having a second focal length and a second field of view disposed within the first field of view. The processor is further configured to, for each of the plurality of frames, align at least a portion of the first image and at least a portion of the second image to produce aligned images. The processor is additionally configured to, for each of the plurality of frames, fuse the aligned images based on a diffusion kernel to produce a fused image. The diffusion kernel indicates a threshold level over a gray level range. The processor is also configured to, for each of the plurality of frames, output the fused image.

A non-transitory tangible computer-readable medium storing computer executable code is also described. The computer-readable medium includes code for causing an electronic device to, for each of a plurality of frames of a video feed, obtain a first image from a first camera, the first camera having a first focal length and a first field of view. The computer-readable medium also includes code for causing the electronic device to, for each of the plurality of frames, obtain a second image from a second camera, the second camera having a second focal length and a second field of view disposed within the first field of view. The computer-readable medium further includes code for causing the electronic device to, for each of the plurality of frames, align at least a portion of the first image and at least a portion of the second image to produce aligned images. The computer-readable medium additionally includes code for causing the electronic device to, for each of the plurality of frames, fuse the aligned images based on a diffusion kernel to produce a fused image. The diffusion kernel indicates a threshold level over a gray level range. The computer-readable medium also includes code for causing the electronic device to, for each of the plurality of frames, output the fused image.

An apparatus is also described. The apparatus includes means for obtaining a first image from a first camera for each of a plurality of frames of a video feed, the first camera having a first focal length and a first field of view. The apparatus also includes means for obtaining a second image from a second camera for each of the plurality of frames, the second camera having a second focal length and a second field of view disposed within the first field of view. The apparatus further includes means for aligning at least a portion of the first image and at least a portion of the second image to produce aligned images for each of the plurality of frames. The apparatus additionally includes means for fusing the aligned images based on a diffusion kernel to produce a fused image for each of the plurality of frames. The diffusion kernel indicates a threshold level over a gray level range. The apparatus also includes means for outputting the fused image for each of the plurality of frames.

DETAILED DESCRIPTION

Figure 1:
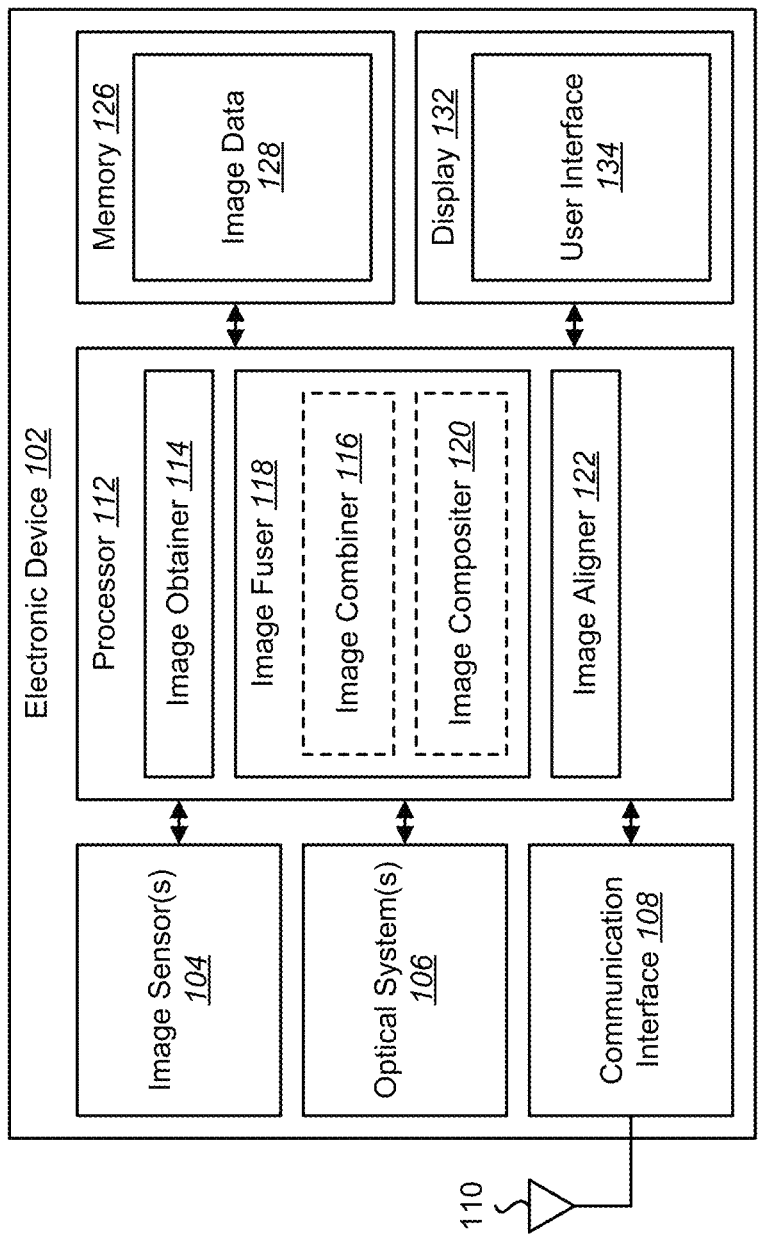
FIG. 1 is a block diagram illustrating one example of an electronic device in which systems and methods for fusing images may be implemented.

Some configurations of the systems and methods disclosed herein may relate to fusing images from different lenses. For example, some configurations of the systems and methods disclosed herein may enable stereo image fusion and/or field of view (FOV) recovery via anisotropic combining and/or via compositing.

Multiple cameras may be implemented in devices (e.g., smart phones) for improving image quality. In some implementations, there may be form factor constraints and/or aperture/sensor size constraints.

Some approaches with multiple cameras may allow zooming with wide and telephoto cameras. For example, a long focal length lens may be used to improve resolution. In some approaches, spatial and/or photometric transformation may be utilized to fuse a wide-angle image with a telephoto image. Transformation and fusion may provide a smooth transition between wide-angle and telephoto cameras, which may improve user experience and recorded video quality. It should be noted that fusion may be performed on one or more images. For example, fusion may be performed frame-by-frame from a video feed (e.g., during video capture) and/or video zoom. Fusion may additionally or alternatively be performed for still mode applications.

In some configurations of the systems and methods disclosed herein, guided noise reduction may be achieved through anisotropic diffusion. For example, reference image (e.g., wide-angle or telephoto) image structure may be used to guide a de-noising filter. This may preserve fine detail and/or may provide superior performance to other transform approaches at low signal-to-noise ratio (SNR).

Some problems that may be addressed with the systems and methods disclosed herein are given as follows. Small apertures may cause noisy images (in smart phone cameras, for example). Some approaches with wide-angle and telephoto cameras do not fuse pixels from both images in video mode. That is to say, some approaches with wide-angle and telephoto dual-camera modules do not combine and/or composite pixels from both cameras in video mode. Transform based de-noising may destroy fine detail at low signal-to-noise ratio (SNR). Some approaches do not employ spatial and photometric alignment.

Some configurations of the systems and methods disclosed herein may address (e.g., provide solutions for) some of the previously described problems. In some configurations of the systems and methods disclosed herein, spatial and photometric alignment may allow diffusion-based denoising. Reference image (e.g., wide-angle image or telephoto image) structure may be used as an input to a guided averaging filter. The combination of alignment and smart averaging may result in enhanced image quality. For example, combining images may reduce noise in the resulting image. More specifically, averaging images in accordance with some of the configurations of the systems and methods disclosed herein may suppress noise by combining information from multiple cameras. This may provide an improved user experience by providing improved image quality.

Moreover, aligning and combining the images from two cameras may provide a seamless transition between image data from a wide-angle camera and image data from a telephoto camera. This may provide an enhanced user experience, particularly for zooming and video applications. For example, some configurations of the systems and methods disclosed herein may combine aligned images, thereby providing enhanced (e.g., de-noised) image quality and zoom from a unified perspective. This may largely avoid a jarring transition (in field of view, image quality, aspect ratio, perspective, and/or image characteristics such as color and white balance) when zooming between a wide-angle camera and a telephoto camera.

Compositing images from a wide-angle camera and a telephoto camera may additionally or alternatively enhance the user experience. For example, manufacturing error may cause a misalignment between a wide-angle camera and a telephoto camera. Compositing the wide-angle image and the telephoto image may restore or maintain an original field of view when transitioning between a wide-angle image and telephoto image (in zoom applications, video applications, and/or still mode applications, for example). This may maintain perspective and/or may avoid losing field of view data when utilizing image data from both cameras.

It should be noted that fusing images may include combining images, compositing (e.g., mosaicing) images, or both. For example, combining fusion may provide de-noising and/or detail enhancement. Compositing fusion may provide pixel recovery (e.g., field-of-view recovery). Accordingly, fusing images may include just combining images in some configurations, just compositing images in some configurations, or may include combining and compositing images in some configurations. It should be noted that fusion may be applied to still images, to a series of images (e.g., video frames), and/or during zoom.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for fusing images may be implemented. Examples of the electronic device 102 include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry) or a combination of hardware and software (e.g., a processor with instructions).

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein (e.g., wide-angle images, telephoto images, fused images, etc.) may be presented on the display 132 and/or user interface 134.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., image obtainer 114) may obtain one or more images (e.g., digital images, image frames, frames, video, wide-angle images, and/or telephoto images, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, stereoscopic images, wide-angle image(s), telephoto image(s), etc.). In some configurations, the image sensor(s) 104 may capture the one or more images. In some implementations, the electronic device 102 may include multiple optical system(s) 106 and/or multiple image sensors 104. For example, the electronic device 102 may include two lenses (e.g., a wide-angle lens and a telephoto lens) in some configurations. The lenses may have the same focal length or different focal lengths. For instance, the electronic device 102 may include a wide-angle lens and a telephoto lens in some configurations. The wide-angle lens and telephoto lens may each be paired with separate image sensors 104 in some configurations. Alternatively, the wide-angle lens and the telephoto lens may share the same image sensor 104.

Additionally or alternatively, the electronic device 102 may request and/or receive the one or more images from another device (e.g., one or more external image sensors coupled to the electronic device 102, a network server, traffic camera, drop camera, automobile camera, web camera, etc.). In some configurations, the electronic device 102 may request and/or receive the one or more images via the communication interface 108. For example, the electronic device 102 may or may not include a camera (e.g., an image sensor 104 and/or optical system 106) and may receive images (e.g., a wide-angle image and a telephoto image) from one or more remote devices.

The memory 126 may store instructions and/or data. The processor 112 may access (e.g., read from and/or write to) the memory 126. Examples of instructions and/or data that may be stored by the memory 126 may include image data 128, image obtainer 114 instructions, image fuser 118 instructions, image combiner 116 instructions, image compositer 120 instructions, image aligner 122 instructions, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112. For example, the memory 126 may receive one or more frames (e.g., wide-angle images, telephoto images, etc.) from a video feed.

In some configurations, the electronic device 102 may include a camera software application and/or a display 132. When the camera application is running, images of scenes and/or objects that are located within the field of view of the optical system 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames and/or one or more still images.

The processor 112 may include and/or implement an image obtainer 114, an image fuser 118, an image aligner 122, an image combiner 116, and/or an image compositer 120. It should be noted that one or more of the elements illustrated in the electronic device 102 and/or processor 112 may be optional. For example, the image combiner 116 or the image compositer 120 may or may not be included and/or implemented. Additionally or alternatively, one or more of the elements illustrated in the processor 112 may be implemented separately from the processor 112 (e.g., in other circuitry, on another processor, on a separate electronic device, on a graphics processing unit (GPU), etc.).

The processor 112 may include and/or implement an image obtainer 114. One or more images (e.g., image frames, video, video feed(s), burst shots, etc.) may be provided to the image obtainer 114. For example, the image obtainer 114 may obtain image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 or may be captured from one or more remote camera(s). In some cases and/or configurations, a wide-angle image and a telephoto image may be captured concurrently. In some cases and/or configurations, a wide-angle image and a telephoto image may be captured at different times (e.g., in different time frames).

In some configurations, the image obtainer 114 may obtain one or more wide-angle images and/or may obtain one or more telephoto images (e.g., a series of wide-angle images and/or a series of telephoto images, video, video feeds, etc.). A wide-angle image may be captured with a wide-angle lens. A telephoto image may be captured with a telephoto lens. A wide-angle lens may have a shorter focal length and/or a wider field of view (FOV) (e.g., a greater angular range) than the telephoto lens. For example, the telephoto lens may have a narrower FOV (e.g., a lesser angular range) than the wide-angle lens. The telephoto lens may enable capturing greater detail and/or magnified images in comparison with the wide-angle lens. For example, a wide-angle lens may have an equal or a shorter focal length and/or may provide an equal or a larger field of view than a "normal" lens. Additionally or alternatively, a telephoto lens may have an equal or a longer focal length, may provide equal or greater magnification, and/or may provide an equal or a smaller field of view than a "normal" lens. In one example, a 28 millimeter (mm) lens relative to a full-frame image sensor may be considered a "normal" lens. For instance, a lens with a 28 mm focal length may be utilized in smartphone cameras. Lenses with focal lengths equal to or shorter than a normal lens (e.g., 28 mm) (relative to a full-frame sensor, for example) may be considered "wide-angle" lenses, while lenses with focal lengths equal to or longer than a normal lens (e.g., 28 mm) may be considered "telephoto" lenses. In other examples, other lens focal lengths (e.g., 50 mm) may be considered "normal" lenses. It should be noted that the systems and methods disclosed herein may be implemented with multiple lenses of equal or different focal lengths. Configurations described herein with reference to a wide-angle lens and a telephoto lens may be additionally or alternatively implemented with multiple (e.g., a pair of) lenses with equal or different focal lengths and/or lenses of the same or different types (e.g., multiple wide-angle lenses, multiple telephoto lenses, a wide-angle lens and a telephoto lens, multiple normal lenses, a normal lens and a wide-angle lens, a normal lens and a telephoto lens, etc.).

Some configurations of the systems and methods disclosed herein are described in terms of a wide-angle image and a telephoto image. It should be noted that some configurations may be more generally implemented for a first image and a second image instead. For example, a first image may be obtained from a first camera with a first focal length and a first field of view. A second image may be obtained from a second camera with a second focal length and a second field of view. The first focal length and the second focal length may be the same or different. The first field of view and the second field of view may be the same or different. For example, the second camera may have a different focal length and/or field of view, such that the second field of view is disposed within the first field of view.

In some configurations, the image obtainer 114 may request and/or receive one or more images (e.g., image frames, video, etc.). For example, the image obtainer 114 may request and/or receive one or more images from a remote device (e.g., external camera(s), remote server, remote electronic device, etc.) via the communication interface 108. The images obtained from the cameras may be fused by the electronic device 102.

The processor 112 may include and/or implement an image aligner 122. The image aligner 122 may substantially align (e.g., match the viewpoints of) at least two images (e.g., two or more images or portions thereof). In particular, the image aligner 122 may perform spatial alignment and/or photometric alignment. In some configurations, the image aligner 122 may register, rectify, align, and/or warp one or more images (e.g., a series of images, video, etc.). For example, image aligning may include spatially aligning the images such that the images appear to be taken from the same camera pose. In some configurations, for example, the electronic device 102 (e.g., processor 112) may perform one or more transforms (e.g. a depth based transform) between images. Aligning the images (e.g., a wide-angle image and a telephoto image) may produce aligned images. In some configurations, the spatial transform may depend on depth parallax. For example, the electronic device 102 may use stereo image information to determine (e.g., compute) depth information (e.g., a dense depth map). The transform may be applied based on the depth information. Additionally or alternatively, autofocus (AF) information may be utilized to determine depth information. Using depth information to apply the transform may increase accuracy (e.g., alignment accuracy) and/or reduce errors, which may improve image fusion. Examples of approaches for aligning images are provided in connection with one or more of FIGS. 7, 9, 12, and 15.

The processor 112 may include and/or implement an image fuser 118. The image fuser 118 may fuse two or more images (e.g., a wide-angle image and a telephoto image, a series of wide-angle images and telephoto images, a wide-angle video stream and a telephoto video stream, a previous image and a subsequent image, etc.). For example, fusing two images may include producing an image that is based on and/or includes data (e.g., pixel data, a sum of pixel data, etc.) from both images. In some configurations, the image fuser 118 may include an image combiner 116 and/or an image compositer 120. In other configurations, one or more of the image combiner 116 and/or the image compositer 120 may be implemented separately and/or independently. It should be noted that the image compositer 120 may not be included and/or implemented in some configurations of the systems and methods disclosed herein. Alternatively, the image combiner 116 may not be included and/or implemented in some configurations of the systems and methods disclosed herein. In some configurations, the image fuser 118 may include both an image combiner 116 and an image compositer 120.

The image combiner 116 may fuse (e.g., combine) images (e.g., aligned images). For example, the image combiner 116 may combine information (e.g., pixel data) from two or more images to produce a combined image. For example, combining images may include determining a similarity measure, determining a diffusion kernel, and/or blending aligned images (based on the similarity measure and/or the diffusion kernel).

In some configurations, the image combiner 116 may fuse (e.g., combine) aligned images based on a diffusion kernel. In some approaches, the diffusion kernel may compute (e.g., may be utilized to compute) a similarity measure between corresponding regions that are to be fused. The diffusion kernel may be used control and/or manipulate the diffusion process based on noise characteristics, degree of object motion, light levels, and/or scene content such as edge direction. Diffusion may be a bandwidth dependent procedure that accomplishes blending. Diffusion may be controlled by the size and/or shape of the kernel function. In regions of low texture (e.g., flat patches), the kernel may map to a low pass filter to provide noise reduction. In areas of high intensity variation (e.g., edges), the kernel may be "all-pass" to prevent blurring. The diffusion kernel may be anistropic in the sense that the diffusion kernel acts differently depending on the input (and/or in the sense that the diffusion kernel becomes and adaptive bandwidth filter, for example). The diffusion kernel may indicate a threshold level over a gray level range. For example, the threshold level may vary in accordance with the gray level. In some approaches, combining images may include determining a similarity measure (e.g., photometric similarity measure) between images, determining a diffusion kernel, and/or blending the images based on the similarity measure and the diffusion kernel.

In some approaches, combining the images may be based on an averaging filter that is guided by reference image structure. The reference image may be one of the images (e.g., wide-angle image, telephoto image, aligned wide-angle image, aligned telephoto image, etc.) used for fusion. In some configurations, the image that is primarily being shown in a preview (on the display 132, via the user interface 134, etc., for example) may be the reference image. In other configurations, the reference image may statically be a telephoto image or a wide-angle image.

The averaging filter may have an adaptive bandwidth based on contrast. The adaptive bandwidth may provide increasing averaging relative to decreasing contrast. Accordingly, overlapping areas between images (e.g., the wide-angle image and the telephoto image) that have a lower amount of contrast may be averaged more, while areas that have a higher amount of contrast (e.g., edges, details, etc.) may be averaged less.

In some configurations, fusing (e.g., combining) the images (e.g., aligned images) may include combining the aligned images in accordance with a weighting based on a similarity measure. The similarity measure may indicate a degree of similarity between images. For example, a photometric similarity measure (e.g., D) may be computed in accordance with Equation (1).

$$D=F(|S_B-S_A|) \quad (1)$$

In Equation (1), D is the photometric similarity measure, F is a function, $S_B$ is a second image (e.g., telephoto image, non-reference image, etc.) or a component thereof (e.g., one or more pixels), and $S_A$ is a first image (e.g., wide-angle image, a reference image, $S_{Aref}$, etc.) or a component thereof (e.g., one or more pixels). In some configurations, F may be a monotonically decreasing function that controls the blending sensitivity to intensity variation within a local neighborhood of the filter response. The photometric similarity measure may be based on a difference between a second image (e.g., a telephoto image) and a first image (e.g., a wide image). For instance, Equation (1) may be written as $D=F(|S_{tele}-S_{wide}|)$, where $S_{wide}$ is a wide-angle image (or a component thereof) and $S_{tele}$ is a telephoto image (or a component thereof).

In some configurations, fusing the images (e.g., aligned images) may be based on a diffusion kernel. The diffusion kernel may indicate a threshold level over a gray level range. An example of the diffusion kernel is provided in connection with FIG. 5. The diffusion kernel (e.g., threshold level) may provide more averaging in areas with low SNR and/or may provide less averaging in areas with high SNR. In some configurations, the diffusion kernel may be expressed in accordance with Equation (2).

$$K(D):K(0)=1, K(\infty)=0, \text{monotonic} \quad (2)$$

In Equation (2), D may denote the similarity measure (e.g., gray level) and K may denote the diffusion kernel value (e.g., threshold level). For example, K is a functional representation of the diffusion kernel, which may be a function of the intensity difference D. In some configurations, K may be similar in effect to F in Equation (1).

In some configurations, combining images may include blending the images. As used herein, the term "blending" may refer to utilizing information (e.g., pixels, pixel data, pixel component data, brightness, intensity, color, etc.) from different images to produce a blended image. For example, blending images may include summing or adding information (e.g., pixel values) from different images. For instance, one or more pixel values of each of the aligned images may be blended to produce a blended value. In some approaches, blending may include determining (e.g., calculating, computing, etc.) a weighted sum of information (e.g., pixel values) from different images. Combining images (using an averaging filter, for example) may include, may utilize, and/or may be based on the similarity measure (e.g., photometric similarity measure), the diffusion kernel, and a blending function. For example, the aligned images may be combined in accordance with a weighting based on a photometric similarity measure between the aligned images. Combining images may include blending one or more pixel values of aligned images. In some configurations, the blending function may be expressed as given in Equation (3).

$$S_{comb}=K(D)S_B+(1-K(D))S_{A\,ref} \quad (3)$$

In Equation (3), $S_{Aref}$ is a first (e.g., reference) image (or a subset thereof), $S_B$ is a second image (or a subset thereof), and $S_{comb}$ is a combined image. In one example, where the wide-angle image (e.g., $S_{wide}$) is the reference image, Equation (3) may be written as follows $S_{comb}=K(D) S_{tele}+(1-K(D))S_{wide}$, where $S_{tele}$ is the telephoto image. In some configurations, fusing (e.g., combining) the images (e.g., aligned images) may include determining the similarity measure, determining the diffusion kernel, and blending the images (e.g., aligned images) based on the photometric similarity measure and the diffusion kernel. It should be noted that Equation (3) may be for illustration purposes to show how a kernel may be used to vary the contribution from two images. Equation (4) below provides an equation that may be used in combining in some configurations.

In some approaches, the blending function may blend one or more previous frames with one or more current frames (e.g., wide-angle image and/or telephoto image). For example, the blending function may be expressed in accordance with Equation (4).

$$S_{comb}(n)=K(D)S_B(n)+(1-K(D))S_{Aref}(n)+S_{comb}(n-1) \quad (4)$$

In Equation (4), n denotes a frame number (e.g., n may denote a current frame and n−1 may denote a previous frame). For instance, Equation (4) may be written as follows in some approaches: $S_{comb}(n)=K(D)S_{tele}(n)+(1-K(D))S_{wide}(n)+S_{comb}(n-1)$.

The image compositer 120 may composite images (e.g., the aligned images). More detail regarding compositing is given in connection with one or more of FIGS. 10-11. For example, the image compositer 120 may composite images (e.g., aligned images) within a region of interest. In some cases, a field of view may be partially lost during image alignment (e.g., restoration, rectification, etc.) due to assembly errors that cause misalignment of optical axes. Calibration data, stereo depth information, and/or autofocus depth information may be utilized to determine the lost regions (e.g., composite regions). In some examples, compositing may utilize a periphery of a wide image to in-paint the lost field of view portion of a telephoto image.

In some configurations, image compositing may include determining (e.g., computing) one or more composite regions and/or seam blending. For example, the composite 120 may compute a composite region from a wide-angle image (within a region of interest, for example) and a composite region from a telephoto image (within the region of interest, for example). The composite 120 may apply a diffusion filter to blend the interface between the telephoto image and the wide-angle image. Compositing the aligned images may be performed in order to recover a field of view based on replacing a region of the field of view that does not exist in the telephoto image, due to baseline shift and camera axis misalignment, with a region of the wide-angle image.

It should be noted that image fusion may include image combining, image compositing, or both. For example, some configurations of the systems and methods disclosed herein may include image combining (and not image compositing). Other configurations of the systems and methods disclosed herein may include image compositing (and not image combining). Yet other configurations of the systems and methods disclosed herein may include both image combining and image compositing.

It should be noted that one or more of the elements or components of the electronic device 102 may be combined and/or divided. For example, one or more of the image obtainer 114, the image aligner 122, the image fuser 118, the image combiner 116, and/or the image compositer 120 may be combined. Additionally or alternatively, one or more of the image obtainer 114, the image aligner 122, the image fuser 118, the image combiner 116, and/or the image compositer 120 may be divided into elements or components that perform a subset of the operations thereof.

Figure 2:
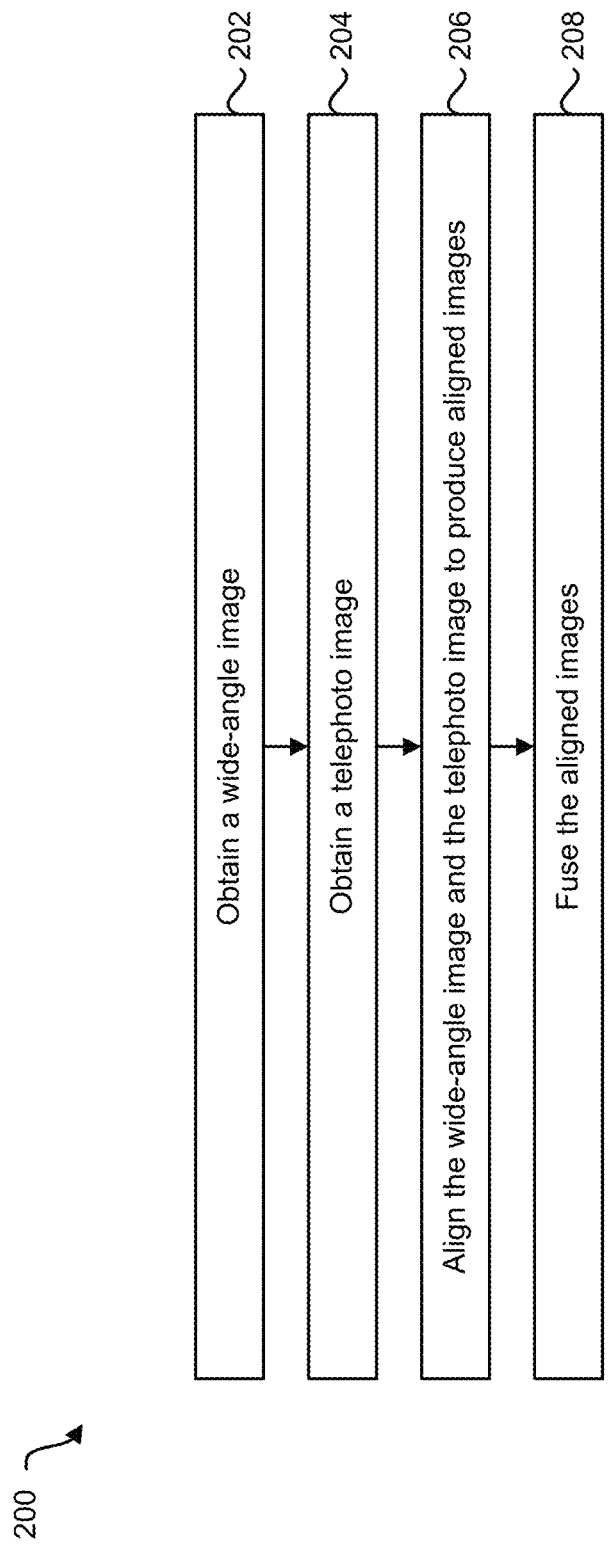
FIG. 2 is a flow diagram illustrating one configuration of a method for fusing images.

FIG. 2 is a flow diagram illustrating one configuration of a method 200 for fusing images. The method 200 may be performed by the electronic device 102, for example.

The electronic device 102 may obtain 202 a first image (e.g., a wide-angle image). This may be accomplished as described above in connection with FIG. 1. For example, the electronic device 102 may capture a first image or may receive a first image from another device. In some configurations, the first image may be obtained from a first camera. The first camera may have a first focal length and a first field of view.

The electronic device 102 may obtain 204 a second image (e.g., a telephoto image). This may be accomplished as described above in connection with FIG. 1. For example, the electronic device 102 may capture a second image or may receive a second image from another device. In some configurations, the second image may be obtained from a second camera. The second camera may have a second focal length and a second field of view. In some implementations, the second field of view may be disposed within the first field of view. For example, the second field of view may be smaller than and/or included within the first field of view.

The electronic device 102 may align 206 the first image (e.g., wide-angle image) and the second image (e.g., telephoto image) to produce aligned images. This may be accomplished as described in connection with FIG. 1. For example, the electronic device 102 may perform spatial and/or telemetric alignment between the first image (e.g., wide-angle image) and the second image (e.g., telephoto image). In some approaches, the electronic device 102 align 206 the first image and the second image as described in connection with one or more of FIGS. 7,9,12, and 15-16.

The electronic device 102 may fuse 208 the aligned images. This may be accomplished as described in connection with FIG. 1. For example, fusing 208 the aligned images may include combining the aligned images. In particular, fusing 208 the aligned images may include combining (e.g., only combining) the aligned images in some configurations. In other configurations, fusing 208 the aligned images may include compositing (e.g., only compositing) the aligned images. In yet other configurations, fusing 208 the aligned images may include both combining and compositing the aligned images.

In some configurations, the electronic device 102 may fuse 208 the aligned images based on a diffusion kernel. The diffusion kernel may indicate a threshold level over a gray level range. Additionally or alternatively, fusing 208 the aligned images may be based on an averaging filter guided by reference image structure. For example, the averaging filter may be adapted based on information in the reference image. Some approaches for combining images are provided in connection with one or more of FIGS. 4-8.

It should be noted that a first image (e.g., wide-angle image) and a second image (e.g., telephoto image) may be captured concurrently in some cases and/or configurations. A first image (e.g., wide-angle image) and a second image (e.g., telephoto image) may be captured at different times (e.g., in different time frames) in some cases and/or configurations. Accordingly, aligning 206 and/or fusing 208 may be performed with concurrent frames (e.g., concurrent wide-angle and telephoto frames) and/or with non-concurrent frames (e.g., wide-angle and telephoto frames captured in different time frames).

In some configurations, the electronic device 102 may output one or more fused images. For example, the electronic device 102 may present one or more fused images on a display. Additionally or alternatively, the electronic device 102 may store one or more fused images in memory. Additionally or alternatively, the electronic device 102 may transmit one or more fused images to another device.

In some configurations, the method 200 may be performed for each of a plurality of frames of a video feed (e.g., frame-by-frame for a plurality of frames in a video feed). For example, the electronic device 102 may fuse two (or more) images for each frame of a video feed. For instance, the method 200 may be performed repeatedly for frames of a video feed. A video feed may include multiple frames (e.g., a series of frames, output frames, image frames, fused images, etc.). The video feed (e.g., each frame of the video feed) may be output to one or more displays. For example, a set of output frames may be generated (at least partially, for instance) by fusing images from two or more sets of images (e.g., video streams) from different lenses (e.g., from a wide-angle camera and a telephoto camera). Additionally or alternatively, two (or more) images may be fused to produce a fused image, where the fused image may be a frame of the video feed. Examples are provided in connection with FIGS. 13-14.

Figure 3:
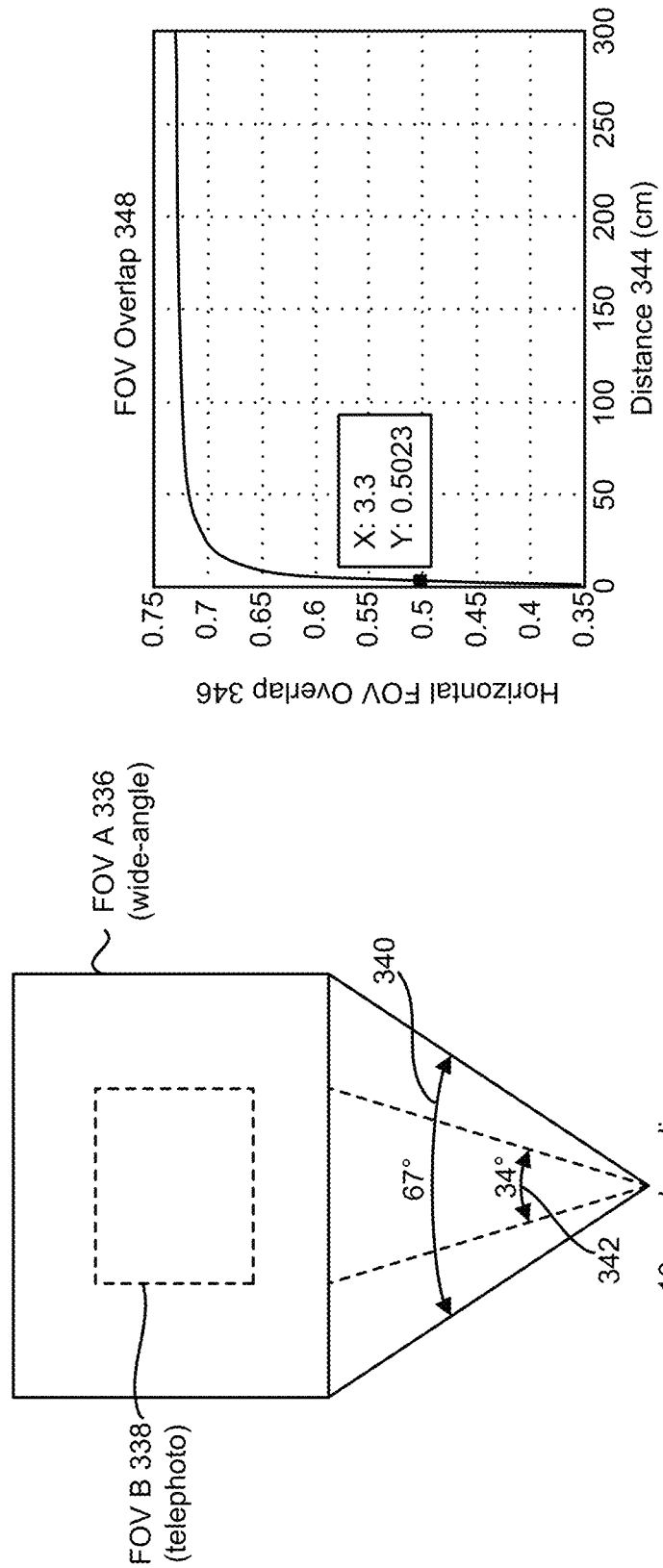
FIG. 3 is a diagram illustrating an example of field of view overlap that may be utilized in accordance with some configurations of the systems and methods disclosed herein.

FIG. 3 is a diagram illustrating an example of field of view (FOV) overlap that may be utilized in accordance with some configurations of the systems and methods disclosed herein. For example, a wide-angle camera (e.g., main camera) may have a 3.59 millimeter (mm) focal length, 4208 1.12 micrometer (μm) pixels, a 67-degree angle of view 340, a 4:3 aspect, and autofocus. The wide-angle camera may provide FOV A 336. A telephoto camera (e.g., auxiliary camera) may have a 6 mm focal length, 3208 1.12 μm pixels, a 4:3 aspect, a 34-degree angle of view 342, and autofocus. The telephoto camera may provide FOV B 338. This may provide a 1 centimeter (cm) or 10 mm base line. The graph in FIG. 3 illustrates an FOV overlap 348. In particular, the graph illustrates a horizontal FOV overlap 346 over distance 344 (in cm). In some configurations, the wide-angle camera and/or the telephoto camera described in connection with FIG. 3 may be implemented in the electronic device 102 described in connection with FIG. 1. For example, the electronic device 102 described in connection with FIG. 1 may include and/or utilize a stereo camera platform. As illustrated in FIG. 3, the FOV of one camera or lens (e.g., telephoto lens) may be completely included within the FOV of another camera or lens (e.g., wide-angle lens) in some configurations.

Figure 4:
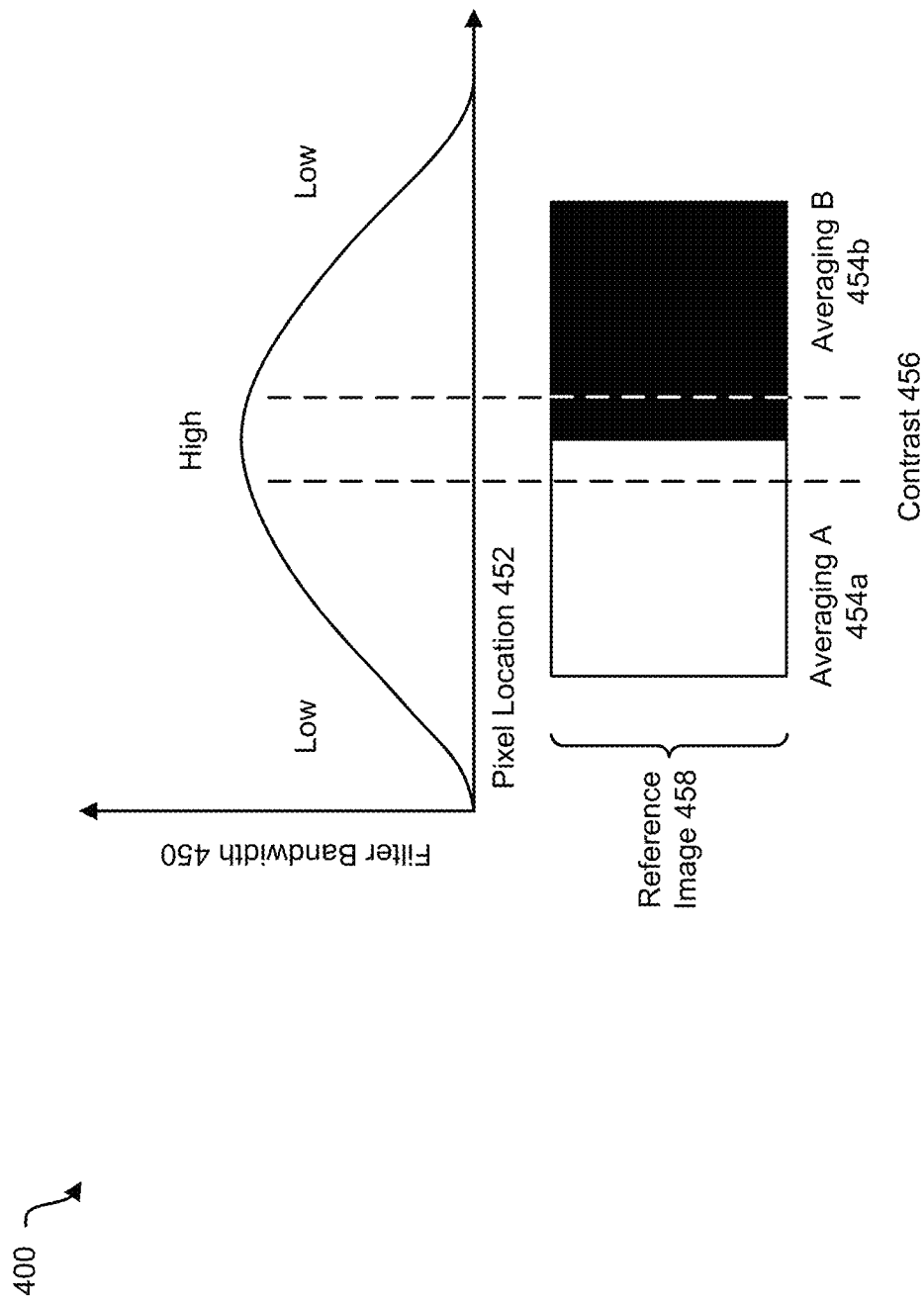
FIG. 4 is a diagram illustrating an example of filter bandwidth over contrast for an averaging filter in accordance with some configurations of the systems and methods disclosed herein.

FIG. 4 is a diagram illustrating an example 400 of filter bandwidth over contrast for an averaging filter in accordance with some configurations of the systems and methods disclosed herein. In particular, the filter bandwidth may vary and/or may be adaptive based on contrast. As described herein, an averaging filter may perform guided noise reduction. For example, the structure of a reference image (e.g., an image being currently presented on a display, a wide-angle image, a telephoto image, etc.) may be utilized to design and/or control a smart noise reduction filter for a second image (e.g., telephoto image, a wide-angle image, etc.). As described in connection with FIG. 1, the averaging filter may be based on and/or may include a similarity measure (e.g., photometric similarity measure, Equation (1), etc.), a diffusion kernel (e.g., Equation (2)), and/or a blending function (e.g., Equation (3), Equation (4), etc.). In areas of high similarity, the averaging filter may be low-pass (e.g., averaging uniform texture). In areas of low similarity (e.g., edges), the averaging filter may be high pass (e.g., edge preserving).

A reference image 458 is illustrated in FIG. 4. For example, the reference image 458 includes a light area, which may be somewhat flat or uniform, next to a dark area, which may be somewhat flat or uniform. An example of filter bandwidth 450 over pixel location 452 corresponding to the reference image 458 is also shown in FIG. 4. As illustrated in FIG. 4, an edge may exist between the light area and the dark area. The edge may be an area of high contrast 456. For example, when another image is aligned with the reference image 458, errors in alignment may cause a similarity measure to indicate a large difference between the reference image and the other image along the edge.

In accordance with some configurations of the systems and methods disclosed herein, the filter bandwidth 450 may vary based on the reference image 458 structure. As illustrated in FIG. 4, for example, the filter bandwidth 450 may be low in areas with high similarity (e.g., flat or uniform areas, where the similarity measure may indicate high similarity between images). For instance, in the light area where the filter bandwidth 450 is low, the filter may perform averaging A 454a. In the dark area where the filter bandwidth 450 is low, the filter may perform averaging B 454b. Performing averaging in areas of high similarity may reduce noise in the combined image. Along the edge, where the similarity measure may indicate a large difference, the filter bandwidth 450 may be high, which may pass high frequency content. This may preserve edges with little or no averaging. Averaging in areas of low similarity (e.g., edges) may cause blurring in the combined image. Accordingly, some configurations of the systems and methods disclosed herein may perform averaging in similar areas to beneficially reduce noise and may preserve edges in dissimilar areas.

Figure 5:
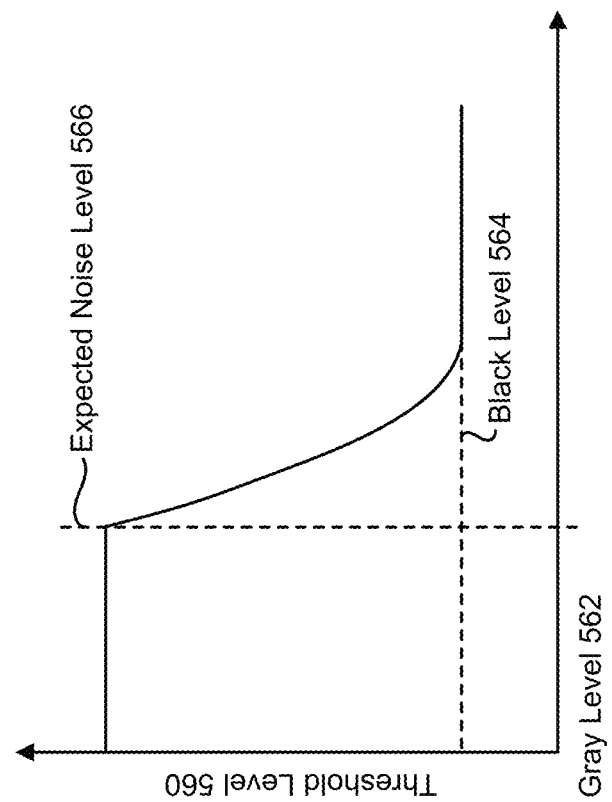
FIG. 5 is a diagram illustrating one example of a diffusion kernel in accordance with some configurations of the systems and methods disclosed herein.

FIG. 5 is a diagram illustrating one example 500 of a diffusion kernel in accordance with some configurations of the systems and methods disclosed herein. The diffusion kernel may have an adaptive bandwidth. In FIG. 5, the diffusion kernel is illustrated in threshold level 560 over gray level 562.

In some configurations, the diffusion kernel may be a function that meets the conditions in Equation (2) (e.g., K(0)=1, K(∞)=0, monotonic). For example, the diffusion kernel may be a function that varies monotonically (over a similarity measure D or gray level, for example), where K(0)=1 and K(∞)=0. In some configurations, the diffusion kernel may have a value of 1 from 0 to a point (e.g., an expected noise level 566). The diffusion kernel value may decrease after the point until reaching 0 (e.g., black level 564). In some configurations, the noise level (e.g., the expected noise level 566) is provided by the statistical characterization of the scene by an image processor. The noise level (e.g., expected noise level 566) may be related to the light level. The black level 564 may be the intensity returned by the sensor for a region of the lowest reflectivity and may be determined by the sensor characteristics. For example, the expected noise level 566 and the black level 564 may be computed in a camera pipeline (e.g., in a processor 112).

In some configurations, the diffusion kernel may be a piecewise function. For instance, the diffusion kernel may be a value (e.g., 1) in a range of 0 to a first point and then may decrease from the first point to a second point. Between the first point and the second point, the diffusion kernel may decrease in accordance with one or more functions (e.g., a linear function, a step function, a polynomial function, a quadratic function, a logarithmic function, etc.). Beyond the second point, the diffusion kernel may have another value (e.g., 0). In some configurations, the diffusion kernel may be a piecewise continuous function. In some approaches, the diffusion kernel may provide that in regions with high SNR, less averaging may be performed, whereas in regions with low SNR, more averaging may be performed.

Figure 6:
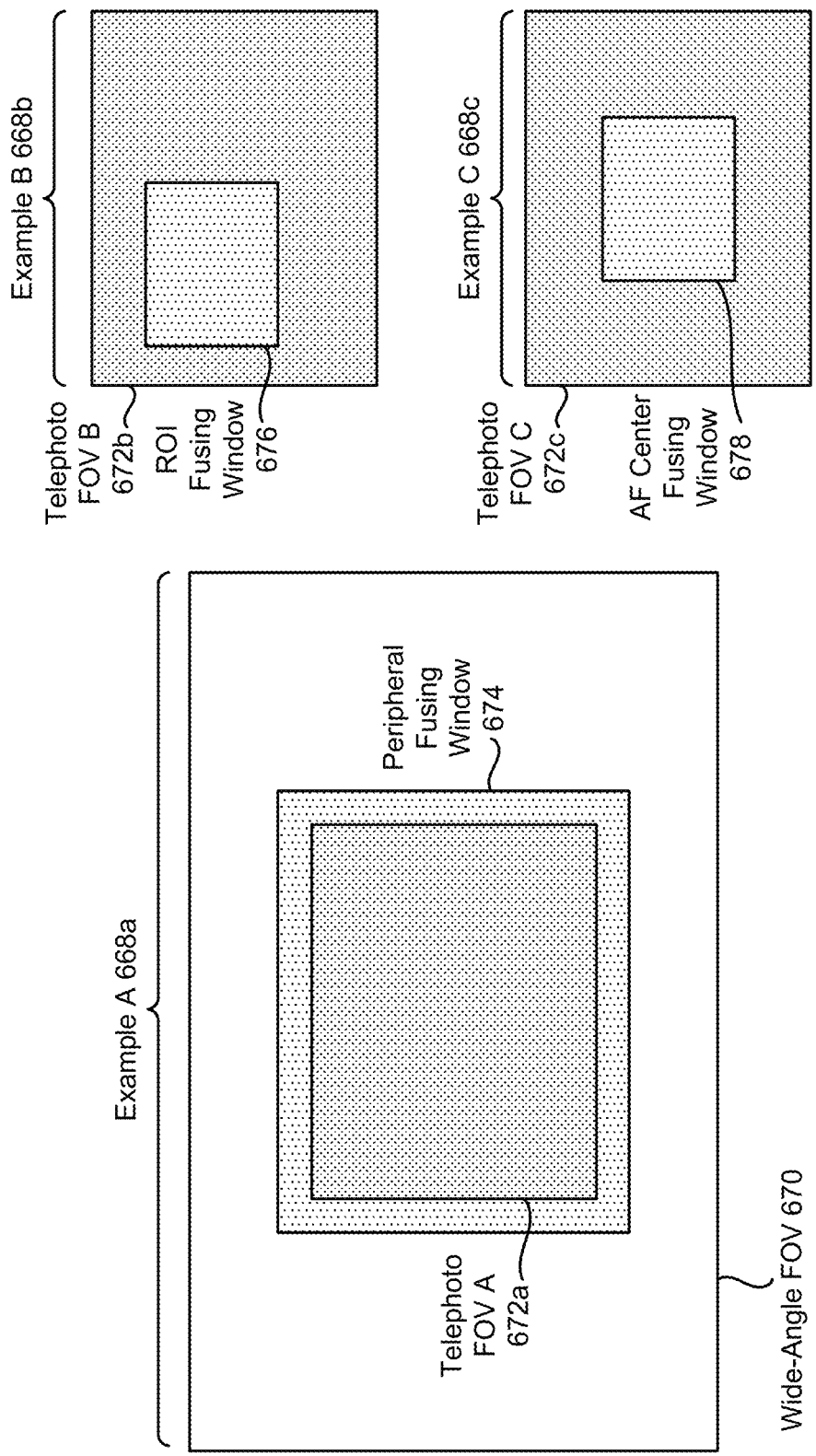
FIG. 6 is a diagram illustrating examples of spatial windowing in accordance with some configurations of the systems and methods disclose herein.

FIG. 6 is a diagram illustrating examples 668a-c of spatial windowing in accordance with some configurations of the systems and methods disclose herein. In particular, FIG. 6 illustrates examples of windows 674, 676, 678 for fusing (e.g., combining, compositing, and/or blending images) images. A window for fusing may be automatically determined, may be static, or may be selectable. Some configurations of the electronic device 102 described in connection with FIG. 1 and/or of the method 200 described in connection with FIG. 2 may operate in accordance with one or more of the approaches described in connection with FIG. 6.

As illustrated in example A 668a, telephoto FOV A 672a is within a wide-angle FOV 670. In example A 668a, a peripheral fusing window 674 may be utilized. In this approach, a telephoto image and a wide-angle image may be fused along the interface between telephoto FOV A 672a and the wide-angle FOV 670. The peripheral fusing window 674 may be determined based on calibration data and/or on runtime data (e.g., depth data).

As illustrated in example B 668b, an ROI fusing window 676 is within telephoto FOV B 672b. In this approach, a telephoto image and a wide-angle image may be fused within an ROI. For example, the electronic device 102 may receive an input (e.g., user interface input, touch screen input, etc.) indicating an ROI (e.g., an ROI center and/or size). The electronic device 102 may perform fusion (e.g., combining, compositing, and/or blending) within the ROI.

As illustrated in example C 668c, an autofocus (AF) center fusing window 678 is within telephoto FOV C 672c. In this approach, a telephoto image and a wide-angle image may be fused within an ROI that corresponds with an autofocus center. For example, the electronic device 102 may determine an ROI (e.g., an ROI center and/or size) corresponding to an autofocus center. The electronic device 102 may perform fusion (e.g., combining, compositing, and/or blending) within the autofocus center ROI.

In some configurations, the window location may be denoted W. The diffusion kernel (e.g., diffusion constant) for similarity D and location W may be given as K(D, W)=K(W)K(D). For example, some use cases may include fusion for wide FOV blending, AF center, and/or a user-selected region of interest (ROI). Accordingly, one or more of the fusion techniques (e.g., combining, compositing, and/or blending) may be applied to a subset of the images (e.g., wide-angle image and/or telephoto image). The subset may correspond to a region of interest (e.g., user-selected ROI, an autofocus ROI corresponding to an autofocus center, etc.).

Figure 7:
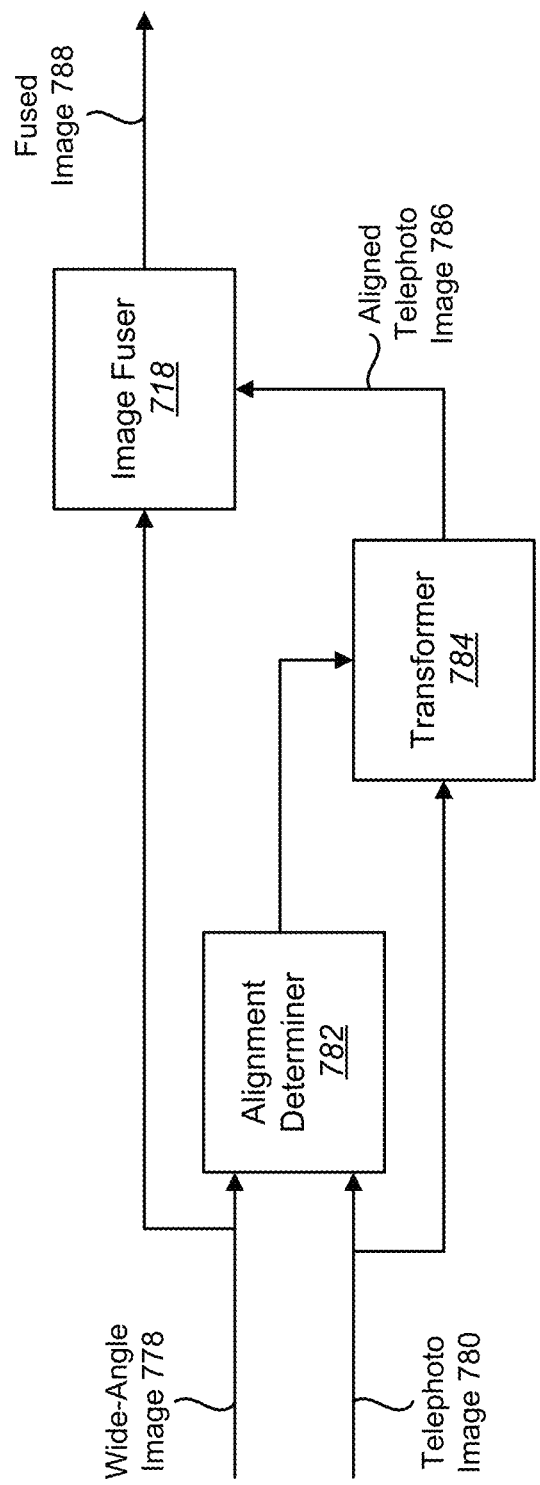
FIG. 7 is a block diagram illustrating an example of elements and/or components (e.g., an algorithm) that may be implemented in accordance with some configurations of the systems and methods disclosed herein.

FIG. 7 is a block diagram illustrating an example of elements and/or components (e.g., an algorithm) that may be implemented in accordance with some configurations of the systems and methods disclosed herein. One or more of the elements and/or components described in connection with FIG. 7 may be implemented on the electronic device 102 described in connection with FIG. 1 in some configurations. For example, the alignment determiner 782 and/or the transformer 784 described in connection with FIG. 7 may be included in the image aligner 122 described in connection with FIG. 1 in some configurations. Additionally or alternatively, the image fuser 718 described in connection with FIG. 7 may be an example of the image fuser 118 described in connection with FIG. 1.

As illustrated in FIG. 7, a wide-angle image 778 and a telephoto image 780 may be provided to an alignment determiner 782. The alignment determiner 782 may determine an alignment (e.g., distances between corresponding features, scaling, translation, and/or rotation, etc.) between the telephoto image 780 and the wide-angle image 778. For example, the alignment determiner 782 may compute a transform (e.g., determine scaling, a translation, and/or a rotation) of the telephoto image 780 that would approximately align the telephoto image 780 (e.g., one or more features of the telephoto image 780) to the wide-angle image 778 (e.g., one or more features of the wide-angle image 778). In other approaches, a wide-angle image may be aligned to a telephoto image.

The alignment (e.g., transform) may be provided to a transformer 784. The transformer 784 may apply a transform (e.g., scaling, translation, and/or rotation, etc.) to the telephoto image 780 in order to approximately align the telephoto image 780 to the wide-angle image 778. For example, the transformer 784 may produce an aligned telephoto image 786.

Alignment may be a precursor to structure-based fusing (e.g., combining). In the example illustrated in FIG. 7, a transform may be applied based on the alignment. For example, a transform may be applied to the telephoto image 780 to align the telephoto image 780 with the wide-angle image 778. Accordingly, the wide-angle image and the telephoto image may be aligned images. It should be noted that "aligning" a first image and a second image, as used herein, may include aligning one of the images to the other image (e.g., changing one image to align it to another image) or changing both images to achieve alignment.

The wide-angle image 778 and the aligned telephoto image 786 may be provided to the image fuser 718. For example, the aligned images may be provided to the image fuser 718. The image fuser 718 may fuse (e.g., combine and/or composite) the aligned images to produce a fused image 788 (e.g., a fused output, a combined image, etc.). The fused image 788 may include intelligently averaged pixels from both images (e.g., cameras).

Figure 8:
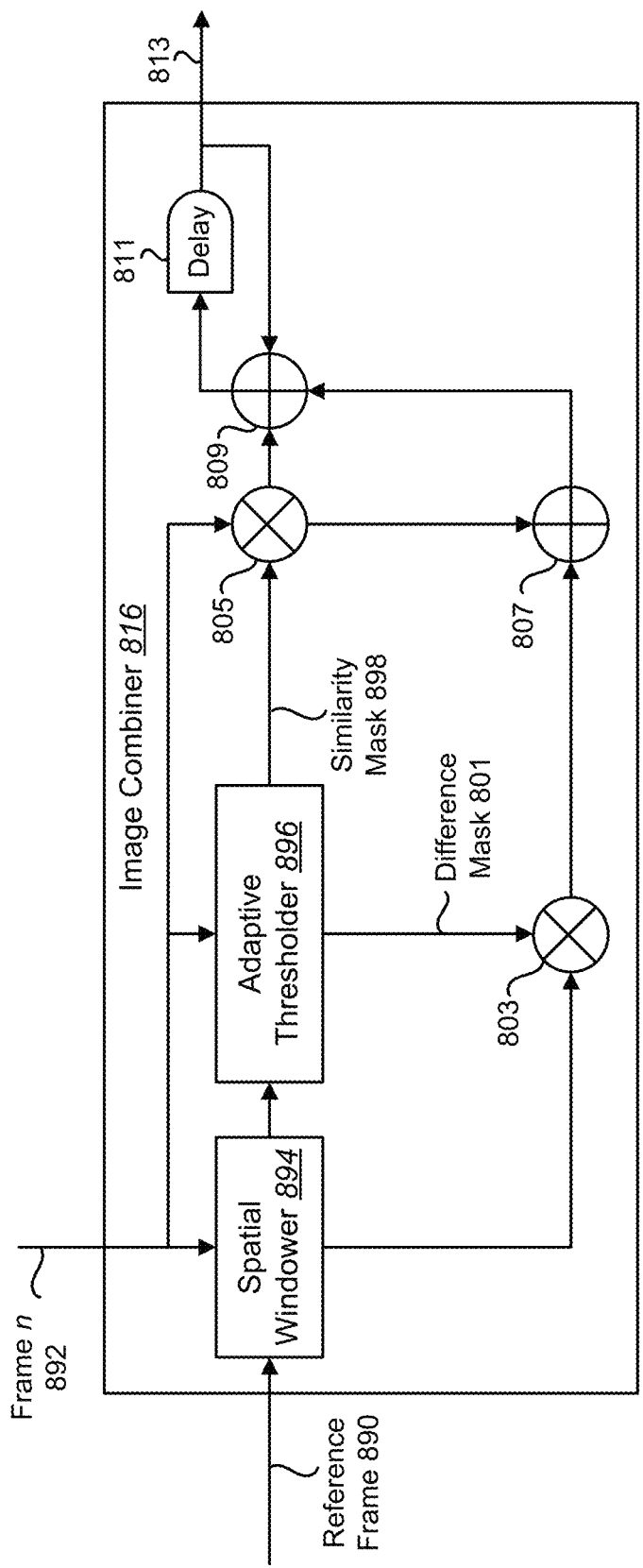
FIG. 8 is a block diagram illustrating an example of an image combiner that may be implemented in accordance with some configurations of the systems and methods disclosed herein.

FIG. 8 is a block diagram illustrating an example of an image combiner 816 that may be implemented in accordance with some configurations of the systems and methods disclosed herein. The image combiner 816 may be an example of the image combiner 116 (e.g., combining filter, averaging filter, etc.) described in connection with FIG. 1. The image combiner 816 may include a spatial windower 894, an adaptive thresholder 896, a first multiplier 803, a second multiplier 805, a first adder 807, a second adder 809, and/or a delay 811.

As illustrated in FIG. 8, a reference frame 890 (e.g., reference image) and frame n 892 (e.g., a second image) may be provided to the image combiner 816. In some configurations, the reference frame 890 may be an image with structure that is utilized to guide the image combiner 816 (e.g., averaging filter) in combining frame n 892 with the reference frame 890. In some approaches, the reference frame 890 may be a telephoto image and frame n 892 may be a wide-angle image. Alternatively, the reference frame 890 may be a wide-angle image and frame n 892 may be a telephoto image. For example, a reference frame 890 (e.g., wide image content) may be used as a reference for de-noising (e.g., de-noising a telephoto image). It should be noted that the reference frame 890 and frame n 892 may be aligned images. For example, frame n 892 may be aligned (e.g., spatially aligned) to the reference frame 890 (or the reference frame 890 may be aligned to frame n 892, for instance). In some approaches, the reference frame 890 may be concurrent with frame n 892. For example, the reference frame 890 may be captured at the same time as or in a time period that overlaps with the capture of frame n 892. For instance, both the reference frame 890 and frame n 892 may be captured within a time period n. In other approaches, the reference frame 890 may be captured closely in time relative to frame n 892.

In some configurations, the spatial windower 894 may perform windowing on the reference frame 890 and/or on frame n 892. For example, the spatial windower 894 may select a spatial window of the reference frame 890 and/or of frame n 892. The spatial window(s) may be areas of the reference frame 890 and/or of frame n 892 for blending. Some examples of spatial windows are given in connection with FIG. 6. It should be noted that spatial windowing may be optional. In some approaches, all overlapping areas between the reference frame 890 and frame n 892 may be blended. In other approaches, only a subset (e.g., window) may be blended. The reference frame 890 (or a windowed reference frame) may be provided to the first multiplier 803 and/or to the adaptive thresholder 896. In some approaches, the reference frame 890 (or a windowed reference frame) may be denoted $S_A$ or $S_{Aref}$. Additionally or alternatively, frame n 892 (or a windowed frame n) may be provided to the adaptive thresholder 896. In some approaches, frame n 892 (or a windowed frame n) may be denoted $S_B$.

The adaptive thresholder 896 may determine a similarity measure and/or may determine a diffusion kernel. For example, the adaptive thresholder 896 may determine a photometric similarity measure in accordance with Equation (1) (e.g., $D=F(|S_B-S_A|)$. The adaptive thresholder 896 may determine the diffusion kernel. For example, the adaptive thresholder 896 may determine the diffusion kernel based on the similarity metric (e.g., $K(D)$).

The adaptive thresholder 896 may determine a similarity mask 898 and/or a difference mask 801. For example, an adaptive threshold (e.g., the diffusion kernel) may be applied to generate a similarity mask and a difference mask. In some configurations, the similarity mask 898 may be the diffusion kernel (e.g., $K(D)$). In some configurations, the difference mask 801 may be based on the diffusion kernel (e.g., one minus the diffusion kernel, $(1-K(D))$, etc.).

The first multiplier 803 may multiply the difference mask 801 with the reference frame 890 or a windowed reference frame (e.g., $(1-K(D))S_{Aref}$). The product (e.g., a weighted reference image or frame) may be provided to the first adder 807.

The second multiplier 805 may multiply the similarity mask 898 with frame n 892 (e.g., $K(D)S_B$). The product (e.g., a weighted frame n) may be provided to the first adder 807 and/or to the second adder 809. The first adder may sum the outputs of the first multiplier 803 and the second multiplier 805 (e.g., $K(D)S_B+(1-K(D))S_{Aref}$, etc.).

The second adder 809 may add the output of the first adder 807 (e.g., $K(D)S_B+(1-K(D))S_{Aref}$, etc.) to a previous frame (e.g., a previous combined frame, a previous combined image, a preceding combined frame, etc.). For example, the second adder may provide a combined image (e.g., a combined frame, $S_{comb}(n)=K(D)S_B(n)+(1-K(D))$, $S_{Aref}(n)+S_{comb}(n-1)$, etc.). In some approaches, the second adder 809 may also add the product from the second multiplier 805. For example, when the difference is large, K may be small and less averaging may be performed by de-weighting the contribution of $S_B$ in favor of $S_A$ re f. Additionally or alternatively, when the difference is small, K may be large and $S_B$ may be averaged with $S_{comb}$, which is referenced to $S_{Aref}$.

The delay 811 may delay the combined image. For example, the delay 811 may delay the combined image by a frame. The delayed combined image 813 may be provided to the second adder 809 and/or may be output. For example, the delayed combined image 813 may be a de-noised image.

The image combiner 816 may accordingly perform adaptive averaging. For example, pixels of like intensity may be averaged (e.g., low pass regions). Edges may be preserved (e.g., high pass regions).

Figure 9:
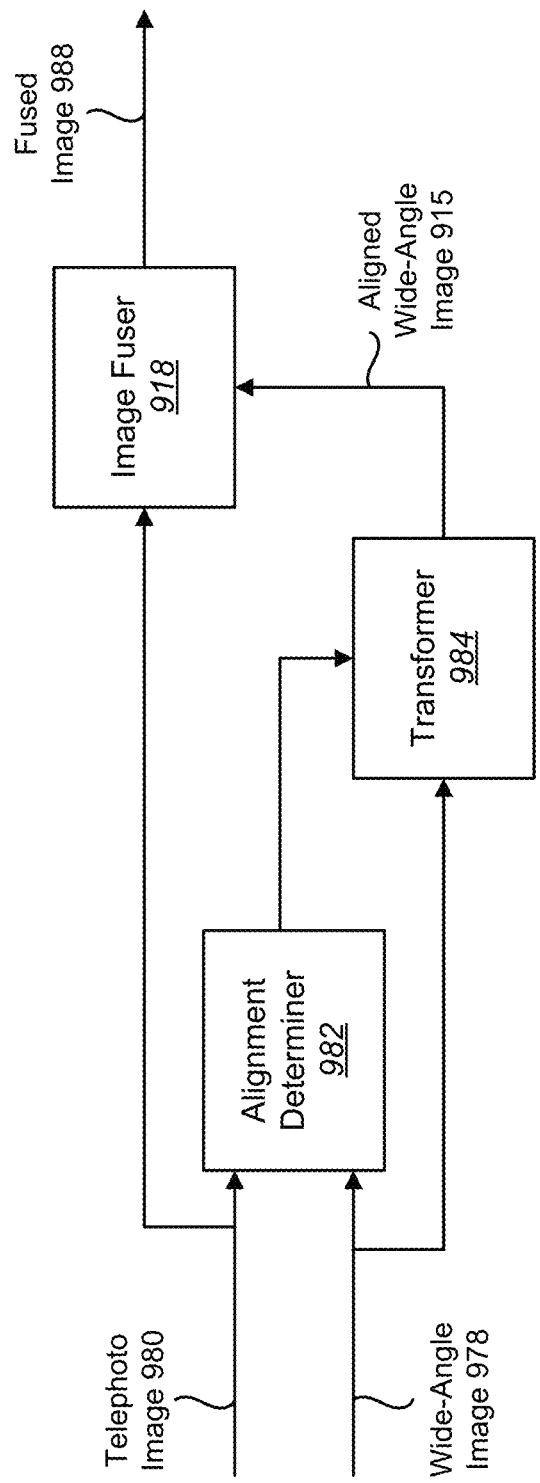
FIG. 9 is a block diagram illustrating another example of elements and/or components (e.g., an algorithm) that may be implemented in accordance with some configurations of the systems and methods disclosed herein.

FIG. 9 is a block diagram illustrating another example of elements and/or components (e.g., an algorithm) that may be implemented in accordance with some configurations of the systems and methods disclosed herein. One or more of the elements and/or components described in connection with FIG. 9 may be implemented on the electronic device 102 described in connection with FIG. 1 in some configurations. For example, the alignment determiner 982 and/or the transformer 984 described in connection with FIG. 9 may be included in the image aligner 122 described in connection with FIG. 1 in some configurations. Additionally or alternatively, the image fuser 918 described in connection with FIG. 9 may be an example of the image fuser 118 described in connection with FIG. 1.

As illustrated in FIG. 9, a wide-angle image 978 and a telephoto image 980 may be provided to an alignment determiner 982. The alignment determiner 982 may determine an alignment (e.g., distances between corresponding features, scaling, translation, and/or rotation, etc.) between the telephoto image 980 and the wide-angle image 978. For example, the alignment determiner 982 may compute a transform (e.g., determine scaling, a translation, and/or a rotation) of the wide-angle image 978 that would approximately align the wide-angle image 978 (e.g., one or more features of the wide-angle image 978) to the telephoto image 980 (e.g., one or more features of the telephoto image 980). In other approaches, a telephoto image may be aligned to a wide-angle image. In some configurations, aligning the images may include spatial and/or photometric alignment.

The alignment (e.g., transform) may be provided to a transformer 984. The transformer 984 may apply a transform (e.g., scaling, translation, and/or rotation, etc.) to the wide-angle image 978 in order to approximately align the wide-angle image 978 to the telephoto image 980. For example, the transformer 984 may produce an aligned wide-angle image 915. Accordingly, the wide-angle image and the telephoto image may be aligned images. For instance, a transform between the images may be computed and then applied to align the images.

The telephoto image 980 and the aligned wide-angle image 915 may be provided to the image fuser 918. For example, the aligned images may be provided to the image fuser 918. The image fuser 918 may fuse (e.g., combine and/or composite) the aligned images to produce a fused image 988 (e.g., a fused output, a combined image, etc.). For example, fusion (e.g., combining and/or compositing or mosaicing) may be performed. The fused image 988 may include intelligently averaged pixels from both images (e.g., cameras).

Figure 10:
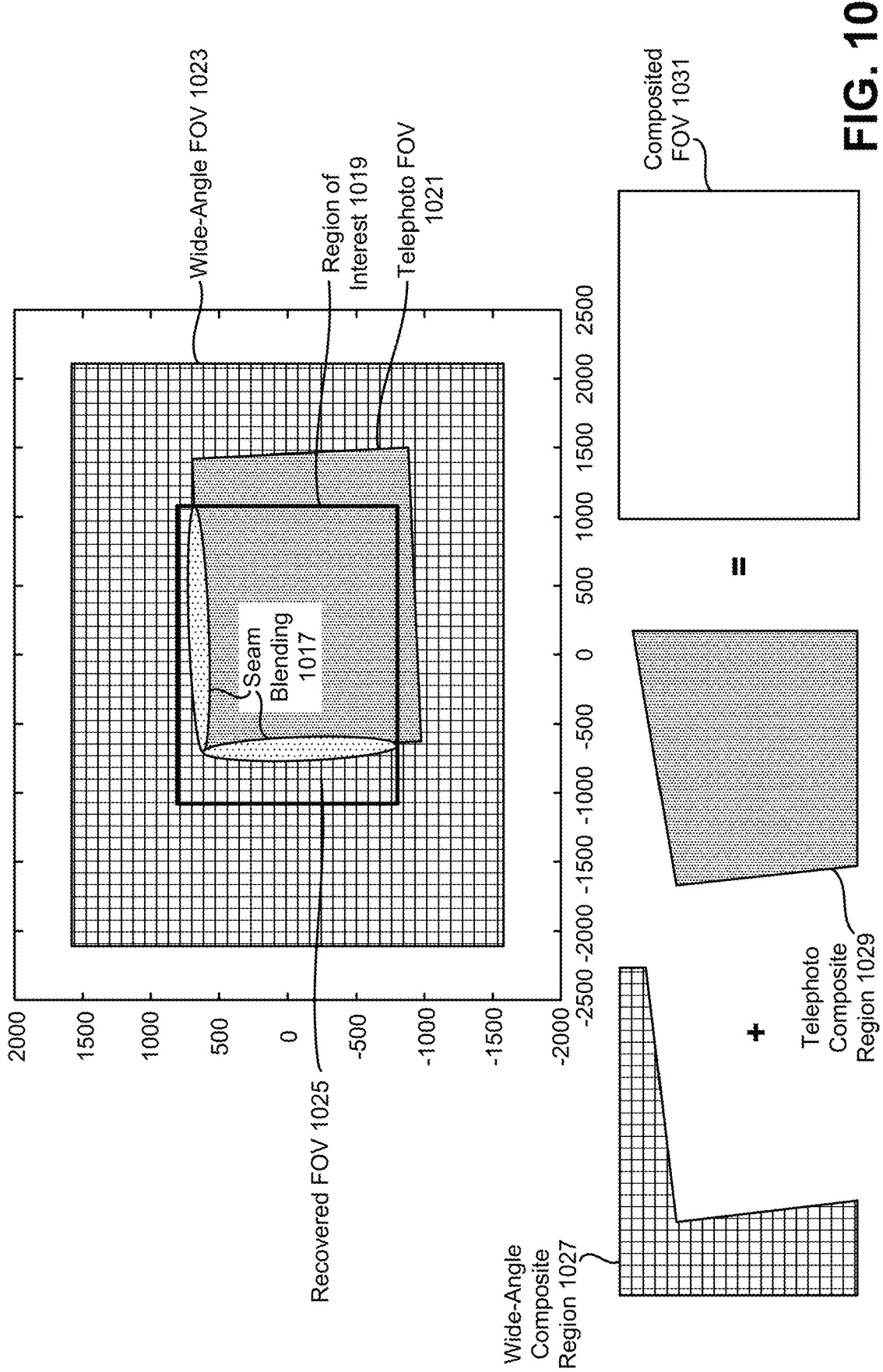
FIG. 10 is a diagram illustrating an example of image compositing. For example, image compositing may be performed for field-of-view recovery.

FIG. 10 is a diagram illustrating an example of image compositing. For example, image compositing may be performed for field-of-view (FOV) recovery. Assembly errors may cause misalignment of optical axes between cameras (e.g., between a wide-angle camera and a telephoto camera). Accordingly, the FOV may be lost (e.g., partially lost) during alignment restoration (e.g., rectification). Calibration data and/or stereo or autofocus (AF) depth information may be utilized to determine lost regions. In some configurations of the systems and methods disclosed herein, the wide-angle image may be utilized to in-paint the periphery of the lost telephoto FOV. In some examples, seam blending (e.g., a diffusion filter) may be applied to blend the interface (e.g., "seams") between the wide-angle image and the telephoto image.

As illustrated in FIG. 10, a wide-angle composite region 1027 (e.g., a set of pixels) from the wide-angle image may be composited (e.g., mosaiced) with a telephoto composite region 1029 (e.g., a set of pixels) from the telephoto image to produce a composited FOV 1031 (e.g., a full field of view). Due to misalignment, for example, a telephoto FOV 1021 may not be completely aligned with a region of interest 1019. Accordingly, an electronic device (e.g., electronic device 102) may determine a telephoto composite region 1029 (a region of the telephoto FOV 1021 or telephoto image that is within the region of interest 1019, for example). The electronic device may additionally or alternatively determine a wide-angle composite region 1027 (e.g., a region of the wide-angle FOV 1023 that is within the region of interest 1019, for example). The wide-angle composite region 1027 may or may not overlap with the telephoto composite region 1029. As illustrated in FIG. 10, the electronic device may perform seam blending 1017 at the interface (e.g., edge or overlap) between the wide-angle composite region 1027 and the telephoto composite region 1029. Compositing the images may provide a recovered FOV 1025 (e.g., a recovered area within the region of interest 1019 that was lost from the telephoto FOV 1021).

In some configurations, the electronic device 102 may perform combining and compositing. For example, the electronic device 102 may combine overlapping areas between the wide-angle image and the telephoto image (within the region of interest, for instance) and may utilize the wide-angle image to fill in the remaining FOV (in the region of interest, for instance). In some approaches, the entire wide-angle image area within the region of interest may be utilized for combining and compositing.

Figure 11:
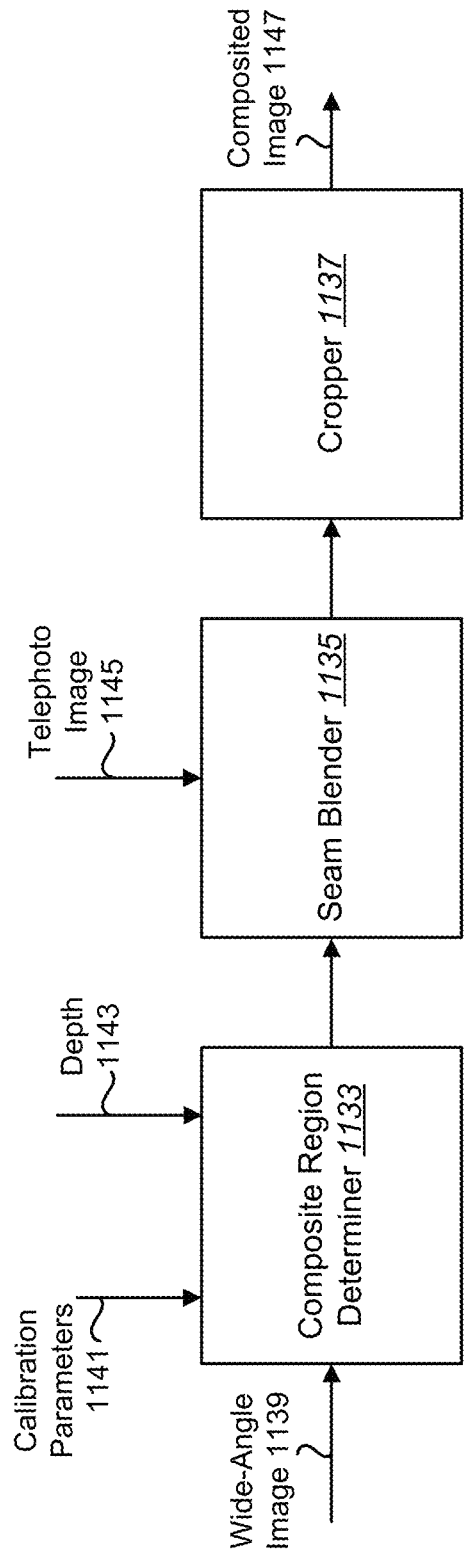
FIG. 11 is a block diagram illustrating one configuration of components that may be implemented to perform image compositing.

FIG. 11 is a block diagram illustrating one configuration of components that may be implemented to perform image compositing. In particular, FIG. 11 illustrates a composite region determiner 1133, a seam blender 1135, and a cropper 1137. One or more of the elements or components described in connection with FIG. 11 may be implemented in the electronic device 102 (e.g., image compositer 120) described in connection with FIG. 1.

The composite region determiner 1133 may determine a wide-angle composite region. For example, the wide-angle image 1139, calibration parameters 1141, and/or depth (e.g., autofocus (AF) depth and/or stereo depth) may be provided to the composite region determiner 1133. The composite region determiner 1133 may utilize the calibration parameters 1141 and depth 1143 to determine (e.g., compute) a composite region of the wide-angle image 1139. For example, the calibration parameters 1141 and/or the depth 1143 may be utilized to determine a region of a wide-angle image within the region of interest (e.g., field of view). For example, the wide-angle composite region of the wide-angle image may be a complementary (e.g., approximately complimentary) region to the region of the telephoto image within the region of interest. The wide-angle composite region may or may not overlap with the telephoto image in the region of interest. In some configurations, the composite region determiner 1133 may discard all or part of the wide-angle image 1139 that overlaps with the telephoto image 1145.

In some approaches, the composite region determiner 1133 may additionally or alternatively determine the telephoto composite region of a telephoto image 1145. For example, the calibration parameters 1141 and/or the depth 1143 may be utilized to determine a region of a telephoto image 1145 that remains within an original region of interest (e.g., field of view) after image alignment. In some approaches, the telephoto composite region may additionally or alternatively be determined (by the cropper 1137, for example) by cropping any of the telephoto image that is outside of the region of interest.

The wide-angle composite region and/or the telephoto composite region may be provided to the seam blender 1135. The seam blender may perform seam blending may be performed between the wide-angle composite region and the telephoto image 1145 (or the telephoto composite region). For example, the interface or "seams" between the wide-angle region image and the telephoto image in the region of interest may be blended. The seam-blended image data (e.g., seam-blended wide-angle composite region and telephoto image 1145, seam-blended wide-angle composite region and telephoto composite region, etc.) may be provided to the cropper 1137.

The cropper 1137 may crop data (e.g., pixel data) that is outside of the region of interest (e.g., the original field of view). For example, the cropper 1137 may remove and/or discard pixel data outside of the region of interest. The cropper 1137 may accordingly produce a composited image 1147 (e.g., fused output).

Figure 12:
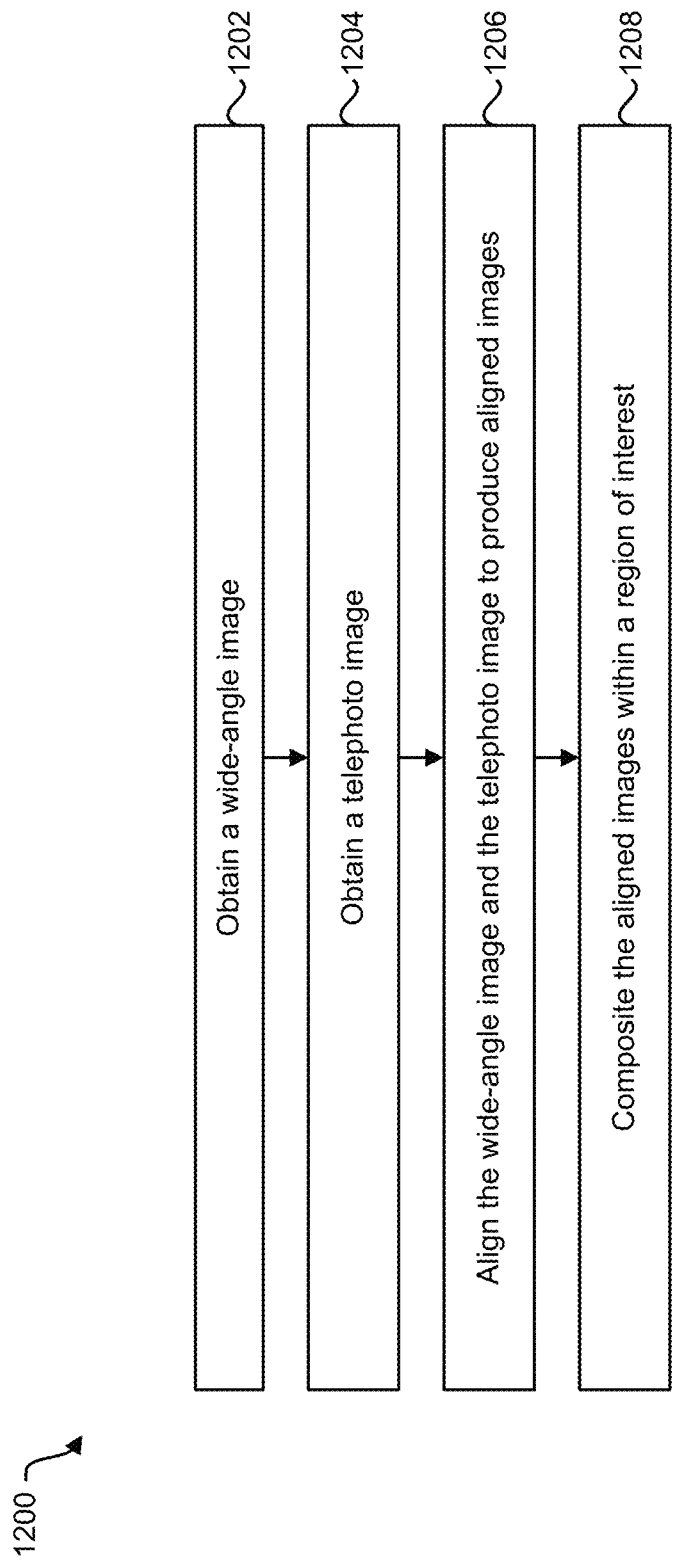
FIG. 12 is a flow diagram illustrating one configuration of a method for image compositing.

FIG. 12 is a flow diagram illustrating one configuration of a method 1200 for image compositing. The method 1200 may be performed by the electronic device 102, for example.

The electronic device 102 may obtain 1202 a wide-angle image. This may be accomplished as described above in connection with one or more of FIGS. 1-2. For example, the electronic device 102 may capture a wide-angle image or may receive a wide-angle image from another device.

The electronic device 102 may obtain 1204 a telephoto image. This may be accomplished as described above in connection with one or more of FIGS. 1-2. For example, the electronic device 102 may capture a telephoto image or may receive a telephoto image from another device.

The electronic device 102 may align 1206 the wide-angle image and the telephoto image to produce aligned images. This may be accomplished as described in connection with one or more of FIGS. 1-2, 7, and 9. For example, the electronic device 102 may perform spatial and/or telemetric alignment between the wide-angle image and the telephoto image.

The electronic device 102 may composite 1208 the aligned images within a region of interest. This may be accomplished as described in connection with one or more of FIGS. 1-2, 7, and 9-11. For example, the electronic device 102 may composite pixels from the wide-angle image with pixels from the telephoto image within a region of interest that corresponds to an original telephoto region of interest before alignment.

Figure 13:
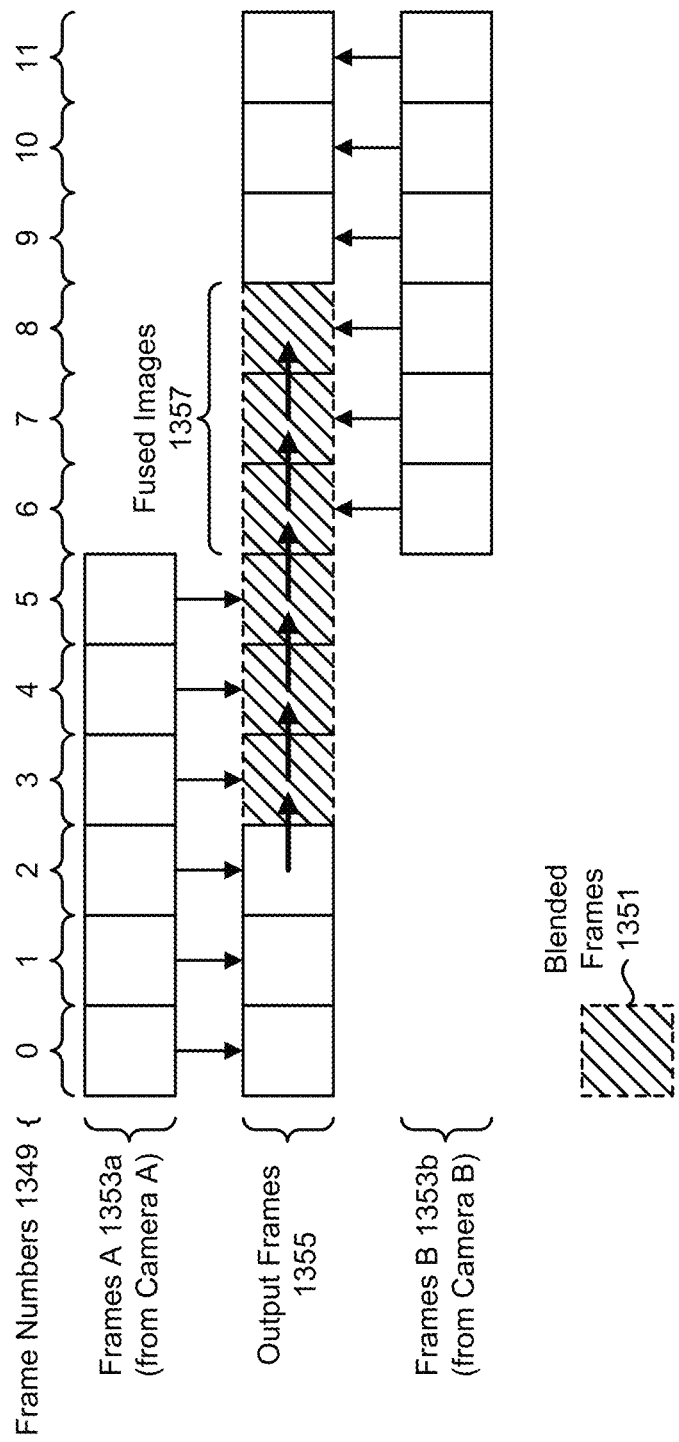
FIG. 13 is a diagram illustrating an example of image fusing in accordance with some configurations of the systems and methods disclosed herein.

FIG. 13 is a diagram illustrating an example of image fusing in accordance with some configurations of the systems and methods disclosed herein. In particular, FIG. 13 illustrates frames A 1353a, frames B 1353b, and output frames 1355. Frames A 1353a may be frames produced from camera A (e.g., a first camera, a wide-angle camera, etc.). Frames B 1353b may be frames produced from camera B (e.g., a second camera, a telephoto camera, etc.). Output frames 1355 may be frames that are output to (e.g., presented on) a display, that are transmitted to another device, and/or that are stored in memory. Frame numbers 1349 may be utilized to indicate frames (e.g., frames A 1353a, frames B 1353b, and/or output frames 1355) corresponding to particular time periods. Some configurations of the systems and methods disclosed herein may include temporal fusion. Temporal fusion may include fusing (e.g., combining and/or compositing) frames from different lenses (e.g., cameras) between time frames (e.g., one or more previous frames and a current frame, etc.). It should be noted that temporal blending may be performed between time frames from a single lens or multiple lenses.

As illustrated in FIG. 13, the output frames 1355 may transition from frames A 1353a to frames B 1353b (without one or more concurrent frames, for example). In transitioning from a first camera (e.g., camera A) to a second camera (e.g., camera B), the first camera may be deactivated and the second camera may be activated. In some configurations, a transition between frames from different cameras may occur during zooming procedures. For example, the output frames 1355 may transition to a telephoto lens from a wide-angle lens when zooming in. Alternatively, the output frames 1355 may transition to a wide-angle lens (e.g., wide-angle camera) from a telephoto lens (e.g., telephoto camera) when zooming out. An electronic device (e.g., electronic device 102) may produce the output frames 1355. The transition illustrated in the example of FIG. 13 is a direct transition (e.g., a hard transition without any concurrent frames between cameras).

An electronic device may blend a number of frames before and/or after the transition. FIG. 13 illustrates six blended frames 1351: three blended frames 1351 before the transition and three blended frames 1351 after the transition. It should be noted that a different number of blended frames (before and/or after a transition, for example) may be produced in accordance with some configurations of the systems and methods disclosed herein.

As illustrated in FIG. 13, frames 0-2 of the output frames 1355 may be frames 0-2 of frames A 1353a. Frames 3-8 of the output frames 1355 may be blended frames 1351. Frames 9-11 of the output frames 1355 may be frames 9-11 of frames B 1353b. More specifically, frame 3 of the output frames 1355 may be produced by blending frame 2 of the output frames 1355 with frame 3 of frames A 1353a. Frame 4 of the output frames 1355 may be produced by blending frame 3 of the output frames 1355 with frame 4 of frames A 1353a. Frame 5 of the output frames 1355 may be produced by blending frame 4 of the output frames 1355 with frame 5 of frames A 1353a. Frame 6 of the output frames 1355 may be produced by blending frame 5 of the output frames 1355 with frame 6 of frames B 1353b. Frame 7 of the output frames 1355 may be produced by blending frame 6 of the output frames 1355 with frame 7 of frames B 1353b. Frame 8 of the output frames 1355 may be produced by blending frame 7 of the output frames 1355 with frame 8 of frames B 1353b.

Frames 6-8 of the output frames 1355 may be fused images 1357. For example, frames 6-8 of the output frames 1355 may be fused images 1357 because they include information (e.g., a contribution) from frames A 1353a and frames B 1353b (e.g., frames from different cameras). For instance, frame 6 of the output frames 1355 includes a contribution frame 6 of frames B 1353b and a contribution from frames 3-5 of the output frames 1355, which include information (e.g., pixel data) from frames A 1353a.

In some configurations, a set of blended output frames may be produced in accordance with Equation (5).

$$S_{out}(n) = \alpha S(n) + (1-\alpha) S_{out}(n-1) \quad \text{for} \quad n = \{T-a, \ldots, T+b-1\} \quad (5)$$

In Equation (5), $\alpha$ is a blending weight, $S_{out}$ is a output frame, S is a frame from the currently active camera, n is a frame number (e.g., an integer number), T is a transition frame (e.g., a frame number for the first frame upon transitioning to a different camera), a is a number of frames for blending before the transition, and b is a number of frames for blending after the transition. In some approaches, $0 < \alpha < 1$. In the example illustrated in FIG. 13, T=6, a=3, and b=3. The approach described in connection with FIG. 13 may be implemented in the electronic device 102 in some configurations.

Figure 14:
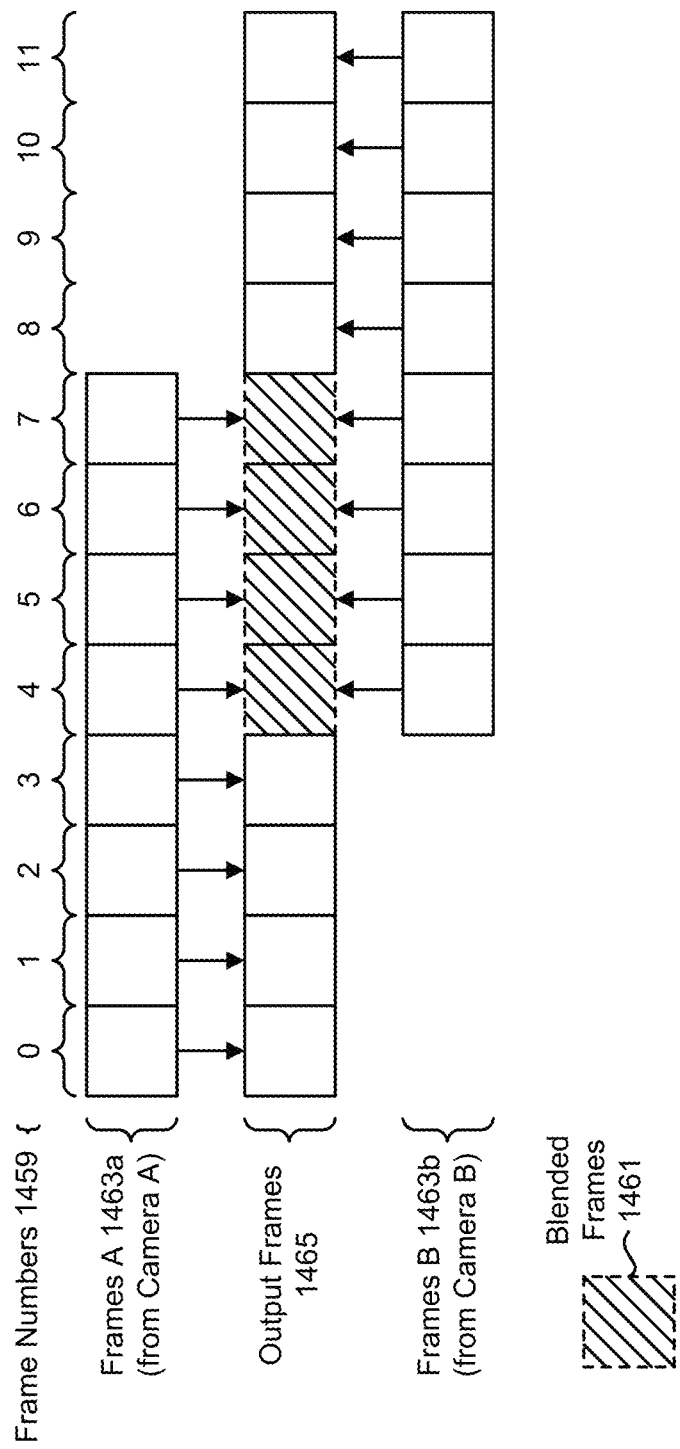
FIG. 14 is a diagram illustrating another example of image fusing in accordance with some configurations of the systems and methods disclosed herein.

FIG. 14 is a diagram illustrating another example of image fusing in accordance with some configurations of the systems and methods disclosed herein. In particular, FIG. 14 illustrates frames A 1463a, frames B 1463b, and output frames 1465. Frames A 1463a may be frames produced from camera A (e.g., a first camera, a wide-angle camera, a telephoto camera, etc.). Frames B 1463b may be frames produced from camera B (e.g., a second camera, a telephoto camera, a wide-angle camera, etc.). Output frames 1465 may be frames that are output to a display, that are transmitted to another device, and/or that are stored in memory. Frame numbers 1459 may be utilized to indicate frames (e.g., frames A 1463*a*, frames B 1463*b*, and/or output frames 1465) corresponding to particular time periods. Some configurations of the systems and methods disclosed herein may include concurrent fusion. Concurrent fusion may include fusing (e.g., combining and/or compositing) frames from different lenses (e.g., cameras) in the same time frame.

As illustrated in FIG. 14, the output frames 1465 may transition from frames A 1463*a* to frames B 1463*b* (with one or more concurrent frames). In transitioning from a first camera (e.g., camera A) to a second camera (e.g., camera B), the first camera may be deactivated and the second camera may be activated. In a concurrent frame transition, both the first camera (e.g., camera A) and the second camera (e.g., camera B) may be concurrently active for a period (e.g., one or more concurrent frames, a transition period, etc.). In some configurations, a transition between frames from different cameras may occur during zooming procedures. For example, the output frames 1465 may transition to a telephoto lens from a wide-angle lens when zooming in. Alternatively, the output frames 1465 may transition to a wide-angle lens (e.g., wide-angle camera) from a telephoto lens (e.g., telephoto camera) when zooming out. An electronic device (e.g., electronic device 102) may produce the output frames 1465.

An electronic device may blend a number of frames during the transition. FIG. 14 illustrates four blended frames 1461 (for frames 4-7). It should be noted that a different number of blended frames (during a transition, for example) may be produced in accordance with some configurations of the systems and methods disclosed herein. For example, a number of blended frames may be 100 or another number. Additionally or alternatively, the transition may occur over a particular time period (e.g., 0.5 seconds, 1 second, etc.). It should be noted that running multiple cameras (e.g., sensors) concurrently may increase power consumption.

As illustrated in FIG. 14, frames 0-3 of the output frames 1465 may be frames 0-3 of frames A 1463*a*. Frames 4-7 of the output frames 1465 may be blended frames 1461 (e.g., fused frames). Frames 8-11 of the output frames 1465 may be frames 8-11 of frames B 1463*b*. More specifically, frame 4 of the output frames 1465 may be produced by fusing frame 4 of frames A 1463*a* with frame 4 of frames B 1463*b*. Frame 5 of the output frames 1465 may be produced by fusing frame 5 of frames A 1463*a* with frame 5 of frames B 1463*b*. Frame 6 of the output frames 1465 may be produced by fusing frame 6 of frames A 1463*a* with frame 6 of frames B 1463*b*. Frame 7 of the output frames 1465 may be produced by fusing frame 7 of frames A 1463*a* with frame 7 of frames B 1463*b*.

Frames 4-7 of the output frames 1465 may be fused images. For example, frames 4-7 of the output frames 1465 may be fused images because they include information (e.g., a contribution) from frames A 1463*a* and frames B 1463*b* (e.g., frames from different cameras). For instance, frame 6 of the output frames 1465 includes a contribution frame 6 of frames B 1463*b* and a contribution from frame 6 of frames A 1463*a*.

In some configurations, a set of fused output frames may be produced in accordance with Equation (6).

$$S_{out}(n) = \alpha_f S_B(n) + (1-\alpha_f) S_A(n-1) \text{ for } n=\{c, \ldots, d\} \quad (6)$$

In Equation (6), a f is a blending weight for fusion (e.g., a diffusion kernel), $S_{out}$ is an output frame, $S_A$ is a frame from a first camera, $S_B$ is a frame from a second camera, n is a frame number (e.g., an integer number), c is a frame number for a first concurrent frame (for fusion, for example), and d is a frame number for a last concurrent frame (for fusion, for example). In some approaches, $0 \leq \alpha_f \leq 1$. In the example illustrated in FIG. 14, c=4, and d=7. In some configurations, $S_A$ may correspond to a wide-angle camera and $S_B$ may correspond to a telephoto camera (or $S_B$ may correspond to a wide-angle camera and $S_A$ may correspond to a telephoto camera, for example). The approach described in connection with FIG. 14 may be implemented in the electronic device 102 in some configurations.

In some configurations of the systems and methods disclosed herein, both temporal blending (and/or temporal fusion) and concurrent blending may be performed. For example, concurrent frames from different cameras may be blended together and may be blended with one or more previous frames (e.g., output frames). Additionally or alternatively, one or more frames after concurrent blending where a camera is deactivated may be blended with one or more previous concurrently blended frames.

Figure 15:
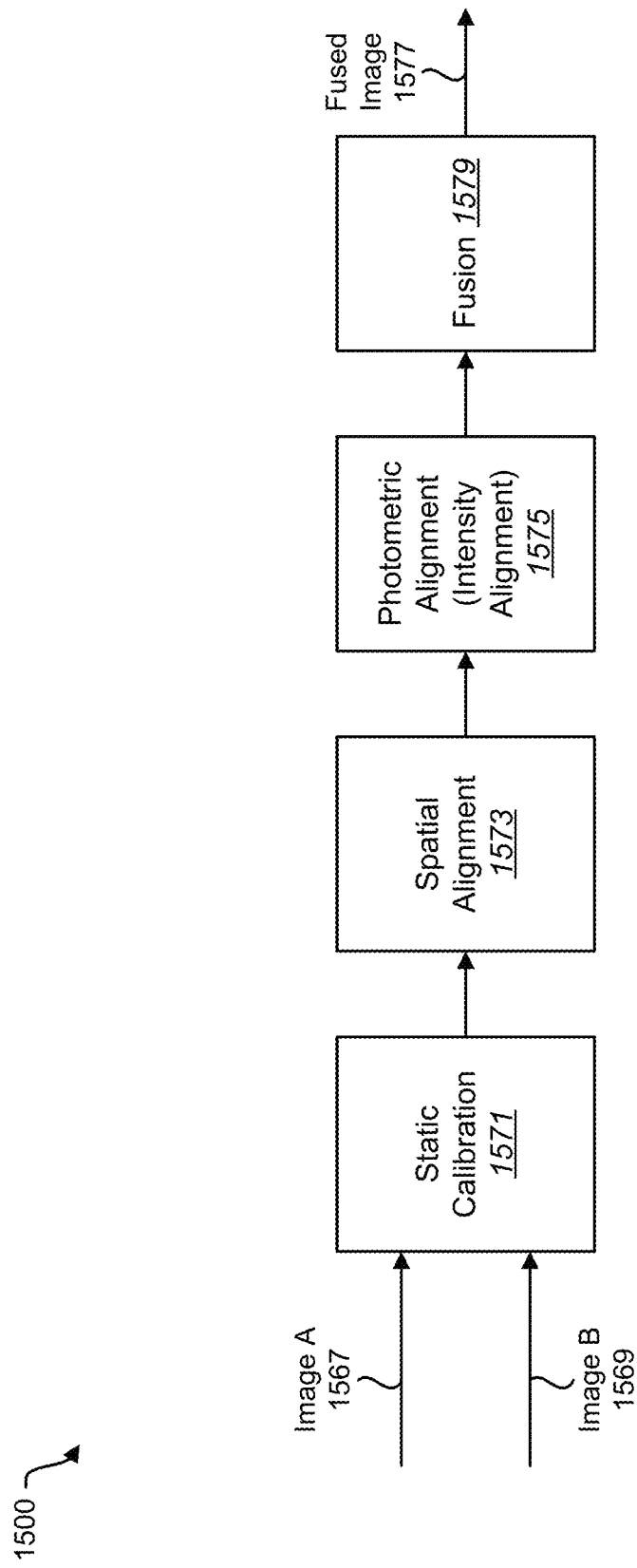
FIG. 15 is a block diagram illustrating an example of the overview of a process and/or system to seamlessly display an image, or a series of images, of a target scene.

FIG. 15 is a block diagram illustrating an example of the overview of a process and/or system 1500 to seamlessly display an image, or a series of images, of a target scene that represent the field-of-view of a multi-camera device (as it is being zoomed-in or zoomed-out, for example), the displayed image including data from one or more of the cameras of the multi-camera device. In such a process/system, the images from the multiple cameras are processed such that when they are displayed, there may not be a perceivable difference to user when the image displayed is being provided from one camera or the other, or both, despite each camera having different imaging characteristics. In the example of FIG. 15, the multi-camera device has two cameras. In other examples, the multi-camera device can have three or more cameras. Each of the illustrated blocks of process/system 1500 is further described herein. One or more of the processes, functions, procedures, etc., described in connection with FIG. 15 may be performed by the electronic device 102 described in connection with FIG. 1 in some configurations. Additionally or alternatively, one or more of the structures, blocks, modules, etc., described in connection with FIG. 15 may be implemented in the electronic device 102 described in connection with FIG. 1 in some configurations.

Image A 1567 from a first camera and image B 1569 from a second camera are received and static calibration 1571 is performed. Although referred to for convenience as image A 1567 and image B 1569, image A 1567 may refer to a series of images from the first camera of the multi-camera device. Such series of images may include "still" images or a series of images captured as video. Similarly, image B 1569 may refer to a series of images from the second camera of the multi-camera device. Such series of images may include "still" images or a series of images captured as video. In some configurations, image A 1567 may represent different images (or image sets) captured at different times (e.g., during calibration, during runtime, etc.). In some configurations, image B 1569 may represent different images (or image sets) captured at different times (e.g., during calibration, during runtime, etc.).

Static calibration 1571 may be performed using a known target scene, for example, a test target. In some examples, static calibration may be performed "at the factory" as an initial calibration step of a multi-camera device. Aspects of static calibration are further described herein. Parameters determined from static calibration 1571 may be stored in memory to be subsequently used for spatial alignment 1573 and/or for photometric alignment 1575.

In this example, spatial alignment 1573 further spatially aligns image A and image B, mapping pixels from image A to corresponding pixels of image B. In other words, spatial alignment 1573 may determine a pixel or a plurality of pixels in image A that represent the same feature as a corresponding pixel of pixels in image B. Certain aspect of spatial alignment are further described herein.

The process/system 1500 also includes photometric alignment 1575, which is also referred to herein as intensity alignment. Photometric alignment 1575 determines transform parameters that indicate a color and/or an intensity transform of corresponding pixels of image A to image B, and vice-versa. Using the photometric alignment information, along with the spatial alignment information, corresponding pixels of image A and image B may be displayed together in a fused image without a user being able to perceive that a portion of the image was generated from the first camera and a portion of the displayed image was generated by the second camera. Certain aspects of photometric alignment are further described herein.

The process/system 1500 also includes fusion 1518 of a portion of image A and a portion of image B to make a displayable fused image 1577 that can be presented to a user to show the target scene being captured by the multi-camera device, where each portion is joined with the other seamlessly such that the displayed image appears to have come from one camera. Fusion of images generated by multiple cameras is further described herein.

In some embodiments, in order to accurately perform spatial alignment and intensity equalization, a static calibration operation can be performed on a multi-camera device. A setup, and stages of, a static calibration procedure according to an embodiment are described as follows. In some embodiments a multi-camera device (e.g., electronic device 102) can include two cameras. A first camera can be a wide-angle camera and a second camera can be a telephoto camera. The static calibration operation can be performed at a factory manufacturing the multi-camera device, where a calibration rig can be used. The calibration rig can be a planar calibration plate with a checkerboard or dot pattern of known size. The cameras can take images of the calibration rig. Using the known features and distances on the calibration rig, a transformation can be estimated. The transformation can include models and parameters of the two asymmetric cameras. These parameters can include a scaling factor. The scaling factor can be defined as roughly the ratio of the focal lengths of the two asymmetric cameras. The two asymmetric cameras have different focal length and magnification, in order to map or juxtapose their images on each other, a scaling factor can be determined. Other parameters of the transformation can include a viewpoint matching matrix, principal offset, geometric calibration, and other parameters relating the images of the first camera to the second camera.

Using the transformation parameters, a mapping can be generated relating the images from the first camera to the images from the second camera or vice versa. The mapping and transformation parameters can be stored in a memory of the multi-camera device, or a memory component that is not part of the multi-camera device. As the multi-camera device is subjected to wear and tear and other factors affecting its initial factory calibration, a subsequent calibration can be used to refine, readjust or tune the transformation parameters and the mapping. For example, the spatial alignment and intensity equalization embodiments described herein can be applied dynamically as the multi-camera device is being used by a user to account for shift in transformation parameters and mapping.

A more detailed example of an embodiment of a spatial alignment module 1573 that can be used to perform spatial alignment of image data generated by two or more cameras that have different imaging characteristics is provided as follows. In one example, an image A 1567 generated by a wide-angle camera can be spatially aligned with an image B 1569 generated by a telephoto camera. In other words, spatial alignment is a mapping of pixels in image A 1567 to align with corresponding pixels in image B 1569. The mapping may also be referred to as a transform. As a result of the mapping (or transform), the images from two cameras can be spatially aligned such that when the images are used, in whole or in part (for example, for a fused image that includes a portion of each of image A 1567 and image B 1569), spatially the images appear to be from the same camera (and viewpoint).

In an embodiment, an image A 1567 and image B 1569 are provided to the spatial alignment module 1573. In various embodiments, the spatial alignment module 1573 may be implemented in software, hardware, or a combination of software and hardware. The spatial alignment module 1573 may use previously determined alignment information (e.g., calibration information, retrieving such information from a memory component, etc.). The previously determined alignment information may be used as a starting point for spatial alignment of images provided by the two cameras. The spatial alignment module 1573 can include a feature detector and a feature matcher. The feature detector may include instructions (or functionality) to detect features (or keypoints) in each of image A 1567 and image B 1569 based on criteria that may be predetermined, by one or more of various feature detection techniques known to a person of ordinary skill in the art. The feature matcher may match the identified features in image A 1567 to image B 1569 using a feature matching technique, for example, image correlation. In some embodiments, the images to be aligned and may be partitioned into blocks, and feature identification and matching may be performed on a block-to-block level.

The spatial alignment module 1573 may also perform dynamic alignment, which can determine spatial transform parameters, for example, scale, rotation, shift, based on feature matching, that can be used to spatially map pixels from image A 1567 to corresponding pixels in image B 1569. In some embodiments, the image data A 1567 can be transformed to be spatially aligned with image data B 1569. In other embodiments, the image data B 1569 can be transformed to be spatially aligned with image data A 1567. As a result of feature detection, matching and dynamic alignment, spatial transform (or mapping) information is generated that indicates operations (e.g., scale, rotation, shift) that need to be done to each pixel, or group of pixels, in image A 1567 to align with a corresponding pixel (or pixels) in image B 1569, or vice-versa. Such spatial transform information is then stored in a memory component to be later retrieved by a processor (e.g., an image processor) to perform spatial alignment of another image or images from the wide-angle camera or the telephoto camera. In some implementations, transformed image data may also be stored in a memory component for later use.

An example of an embodiment of photometric alignment 1575 is given as follows. Implementation of photometric alignment can be in software, for example, as a set of instructions in a module stored in memory, or in hardware, or both. Photometric alignment 1575 may be used to match the color and intensity of pixels in a first image with the corresponding pixels in a second image. Accordingly, this may allow a portion of the first image to be displayed with a portion of the second image in a preview image such that the portions appear to have been generated from the same camera instead of two different cameras with different imaging parameters as such parameters affect intensity and color. In some embodiments, photometric alignment may be performed on two images generated with asymmetric cameras, for example, on images generated from a wide-angel camera and on images generated from a telephoto camera.

Image A 1567 may be received from a wide-angle camera and image B 1569 may be received from a telephoto camera. Aligned image A data and aligned image B data may have been spatially aligned such that pixels from one of the images spatially align with corresponding pixels of the other image. In other embodiments, information provided to photometric alignment 1575 may include predetermined alignment information and/or the unaligned images generated from a first camera and a second camera. In some examples, data representing image A 1567 can be spatially transformed image data A received from the spatial alignment module 1573 and data representing image B 1569 can be spatially transformed image data B received from the spatial alignment module 1573. Image A 1567 and image B 1569 can have variations in intensity values, for example pixel intensity values at and around keypoint features. Although the depicted embodiment is implemented to equalize the intensity values of two images, three or more images can be sent to the intensity alignment module 1575 in other embodiments. In some embodiments of intensity alignment between three or more images, one image can be identified as a reference for matching the intensity values of the other images to the intensity values of the reference image. In some embodiments, the first image sensor and the second image sensor are not asymmetric.

In this example, photometric alignment 1575 may include several functional features or modules, described below. Image A data can be received at a first partition module to be partitioned into K regions of pixel blocks. Image B data can be received at a second partition module to be partitioned into the same number K regions of pixel blocks. The number, size, location, and shape of the pixel blocks may be based on identification of keypoints in image A and image B. In some embodiments, the images can be partitioned according to a predetermined block number and configuration.

Partitioned image data A can be received at a first histogram analysis module and partitioned image data B can be received at a second histogram analysis module. Though described as separate modules, in some embodiments the first histogram analysis module and the second histogram analysis module can be implemented as a single module. The histogram analysis modules can operate to determine a histogram for each of one or more colors, for example, red, green, and blue. For each block of K blocks in each of images A and B, the first histogram analysis module and the second histogram analysis module can compute a probability mass function $h_i$ as shown in Equation (7):

$$h_i(j) = \frac{n_j}{N} \quad (7)$$

for values of i from 1 to K and for j=0, 1, ..., 255, which is the number of values for level j divided by the total number of elements per block N. Accordingly, $h_i$ is the probability mass function (PMF) of the block. This indicates the likelihood of level j occurring in the block, which gives information on the spatial structure content in the region. In other example implementations, other techniques of histogram analysis may be used.

Equalization function $H_1$ can be determined by a first equalization module for the histogram output by the first histogram analysis module. For example, the first equalization module can sum the mass in the PMF according to Equation (8):

$$H_1(j) = \sum_{i=0}^{j} h_2(i) \quad (8)$$

to compute the cumulative mass function (CMF). A second equalization analysis module can compute a similar function $H_2$ for the histogram output by the second histogram analysis module. Each of the first equalization analysis module and the second equalization analysis module can operate as described herein for each of one or more colors, for example, red, green, and blue, although each is not described separately herein. The CMF can indicate how the spatial intensity values change within a block, for example, due to features in the block.

An intensity matching module can perform a spatial mapping between the intensities of image A 1567 and image B 1569 based on the cumulative mass functions determined by the equalization modules. In some embodiments, the equalization function can be applied according to Equation (9):

$$\min_{j \in [0,255]} |H_1(i) - H_2(j)| \quad (9)$$

once the CMFs for all blocks and all sensors have been determined. This can map the intensity values in image B 1569 to the intensity values in image A 1567 such that image B 1569 is transformed to have a histogram closely resembling or matched to a histogram of image A 1567. As a result, the regions may look very similar and can be identified by subsequent processing as corresponding regions in each image even though they were produced with asymmetric sensors. The resulting intensity matched images A and B can be representing according to Equation (10):

$$\hat{J}_k = H_2^{-1}(H_1(i)) \quad (10)$$

In other example implementations, other techniques of intensity matching may be used, sometimes being referred to as color transforms or intensity transforms. In some embodiments, in order to determine new intensity values for the pixels of image B 1569, the matching module can perform bilinear histogram interpolation. For example, for each pixel, four new luma values can be determined by table lookup from loaded histograms. The new luma value for the target pixel may then be determined by a suitable interpolation technique, for example bilinearly, in order generate an equalized pixel value from neighboring histogram information.

Fusion 1579 may be performed on the aligned images based on image A 1567 and image B 1569 to produce a fused image 1577. For example, fusion 1579 may be performed (by the image fuser 118, for instance) in accordance with one or more of the approaches and/or configurations described herein.

Figure 16:
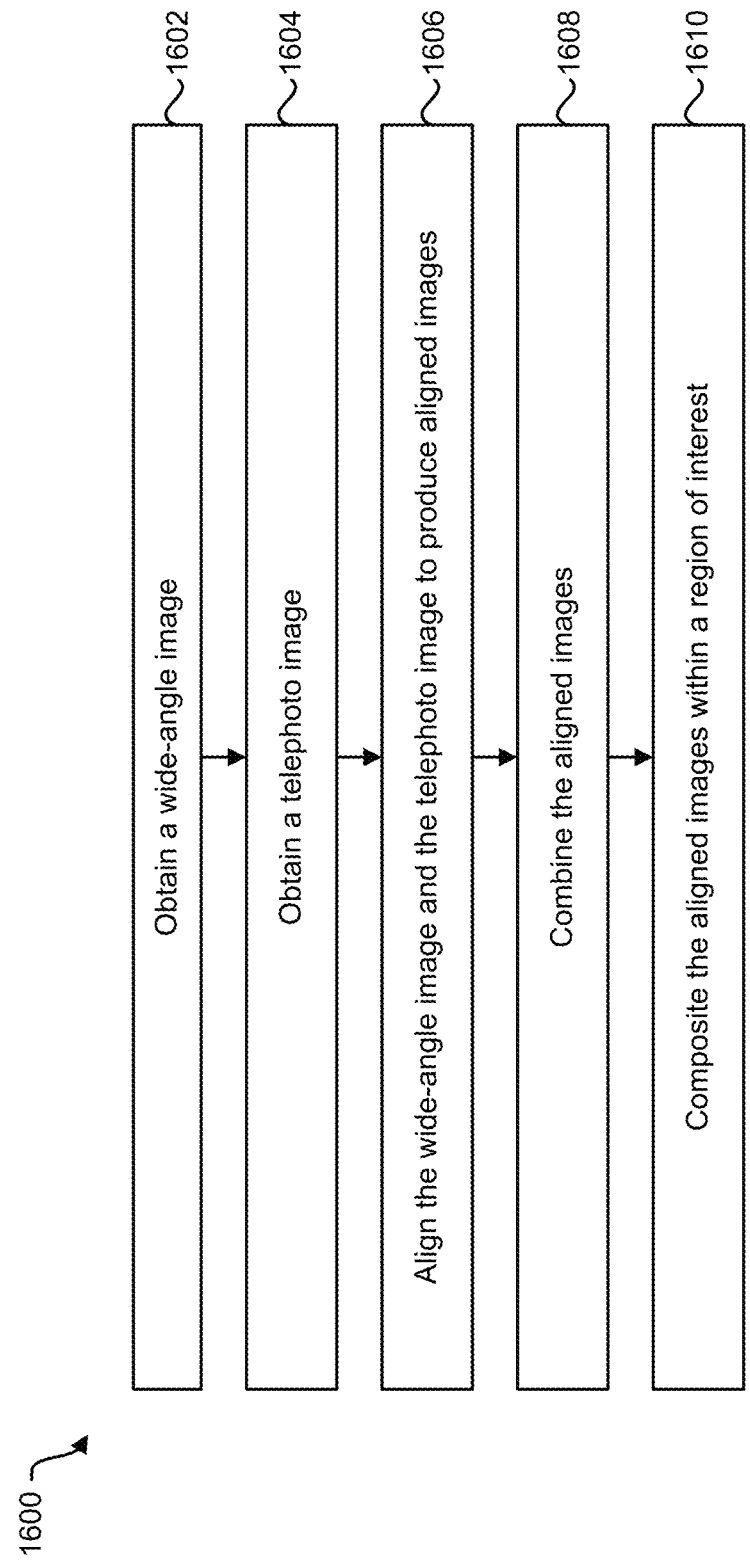
FIG. 16 is a flow diagram illustrating a more specific configuration of a method for image fusing.

FIG. 16 is a flow diagram illustrating a more specific configuration of a method 1600 for image fusing. The method 1600 may be performed by the electronic device 102, for example.

The electronic device 102 may obtain 1602 a wide-angle image. This may be accomplished as described above in connection with one or more of FIGS. 1-2 and 12.

The electronic device 102 may obtain 1604 a telephoto image. This may be accomplished as described above in connection with one or more of FIGS. 1-2 and 12.

The electronic device 102 may align 1606 the wide-angle image and the telephoto image to produce aligned images. This may be accomplished as described in connection with one or more of FIGS. 1-2,7,9,12, and 15. For example, the electronic device 102 may perform spatial and/or photometric alignment between the wide-angle image and the telephoto image.

The electronic device 102 may combine 1608 the aligned images. This may be accomplished as described in connection with one or more of FIGS. 1-2, 4-9, and 12-15. For example, combining 1608 the aligned images may include determining a photometric difference, determining a fusion kernel, and/or blending.

The electronic device 102 may composite 1610 the aligned images within a region of interest. This may be accomplished as described in connection with one or more of FIGS. 1-2, 7, and 9-15. For example, compositing 1610 the aligned images may include determining one or more composite regions and/or seam blending.

Figure 17:
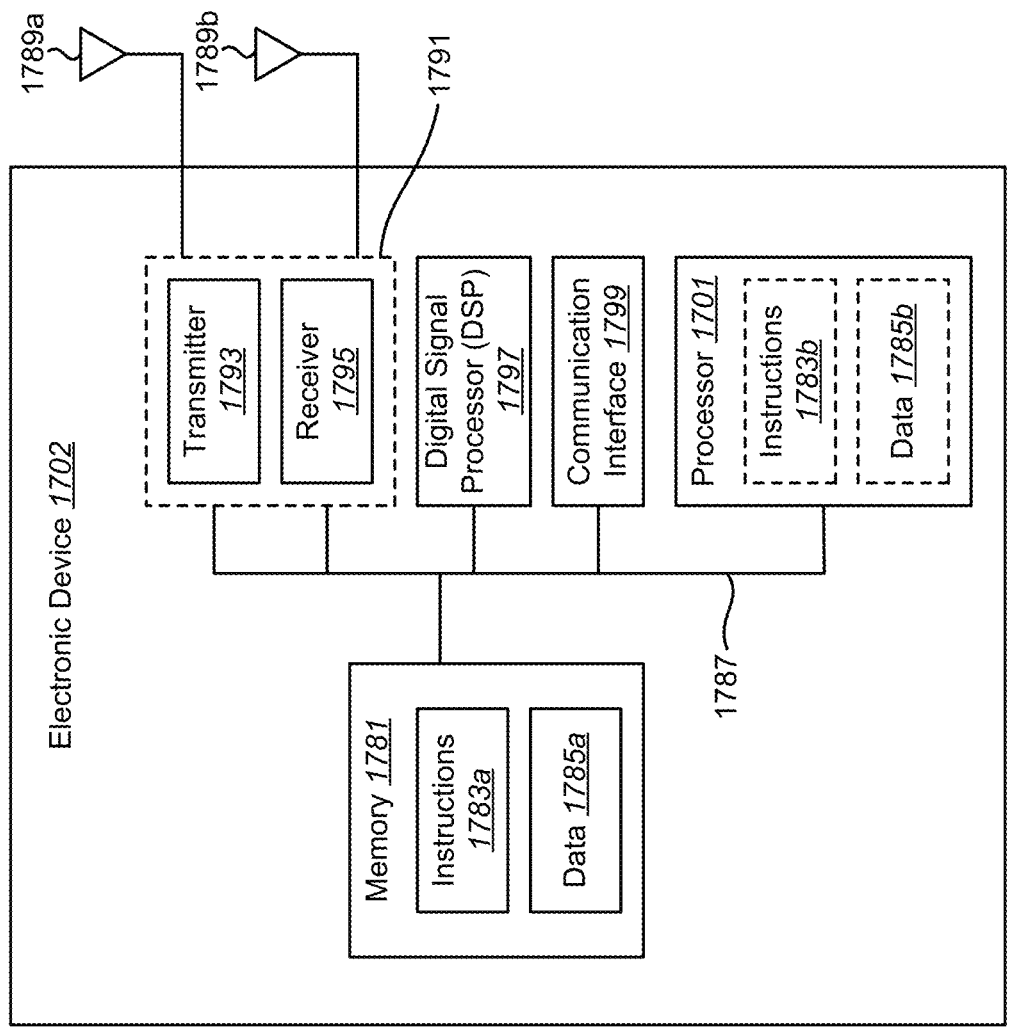
FIG. 17 illustrates certain components that may be included within an electronic device.

FIG. 17 illustrates certain components that may be included within an electronic device 1702. The electronic device 1702 may be an example of and/or may be implemented in accordance with the electronic device 102 described in connection with FIG. 1 and/or in accordance with one or more of the components and/or elements described in connection with one or more of FIGS. 7-9, 11, and 15. The electronic device 1702 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1702 includes a processor 1701. The processor 1701 may be a general purpose single- or multi-chip microprocessor (e.g., an ARM), a special purpose microprocessor (e.g., a digital signal processor (DSP)), a microcontroller, a programmable gate array, etc. The processor 1701 may be referred to as a central processing unit (CPU). Although just a single processor 1701 is shown in the electronic device 1702, in an alternative configuration, a combination of processors (e.g., an ARM and DSP) could be used.

The electronic device 1702 also includes memory 1781. The memory 1781 may be any electronic component capable of storing electronic information. The memory 1781 may be embodied as random access memory (RAM), synchronous dynamic random access memory (SDRAM), read-only memory (ROM), magnetic disk storage media, optical storage media, flash memory devices in RAM, on-board memory included with the processor, EPROM memory, EEPROM memory, registers, and so forth, including combinations thereof.

Data 1785a and instructions 1783a may be stored in the memory 1781. The instructions 1783a may be executable by the processor 1701 to implement one or more of the methods 200, 1200, 1600 described herein. Executing the instructions 1783a may involve the use of the data 1785a that is stored in the memory 1781. When the processor 1701 executes the instructions 1783, various portions of the instructions 1783b may be loaded onto the processor 1701, and various pieces of data 1785b may be loaded onto the processor 1701.

The electronic device 1702 may also include a transmitter 1793 and a receiver 1795 to allow transmission and reception of signals to and from the electronic device 1702. The transmitter 1793 and receiver 1795 may be collectively referred to as a transceiver 1791. One or multiple antennas 1789a—b may be electrically coupled to the transceiver 1791. The electronic device 1702 may also include (not shown) multiple transmitters, multiple receivers, multiple transceivers and/or additional antennas.

The electronic device 1702 may include a digital signal processor (DSP) 1797. The electronic device 1702 may also include a communication interface 1799. The communication interface 1799 may enable one or more kinds of input and/or output. For example, the communication interface 1799 may include one or more ports and/or communication devices for linking other devices to the electronic device 1702. Additionally or alternatively, the communication interface 1799 may include one or more other interfaces (e.g., touchscreen, keypad, keyboard, microphone, camera, etc.). For example, the communication interface 1799 may enable a user to interact with the electronic device 1702.

The various components of the electronic device 1702 may be coupled together by one or more buses, which may include a power bus, a control signal bus, a status signal bus, a data bus, etc. For the sake of clarity, the various buses are illustrated in FIG. 17 as a bus system 1787.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), synchronous dynamic random access memory (SDRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. An apparatus comprising:
   at least one memory; and
   at least one processor coupled to the at least one memory and configured to:
      select, for a fused image, pixels from a first area of a first image obtained using a first type of lens;
      select, for the fused image, pixels from a first area of a second image obtained using a second type of lens that is different than the first type of lens, wherein the first area of the first image and the first area of the second image are within a region of interest, wherein a portion of the region of interest is outside of the first image and is smaller than the second image, and wherein the first area of the second image obtained using the second type of lens is used to fill in the portion of the region of interest not captured in the first area of the first image obtained using the first type of lens;
      blend pixels in a second area of the first image and pixels in a second area of the second image to obtain blended pixels; and
      include the pixels from the first area of the first image, the pixels from the first area of the second image, and the blended pixels in the fused image.

2. The apparatus of claim 1, wherein the at least one processor is configured to:
   output the fused image.

3. The apparatus of claim 1, wherein the second area of the first image is within the first area of the first image, and wherein the second area of the second image is within the first area of the second image.

4. The apparatus of claim 3, wherein the second area of the first image overlaps with the second area of the second image.

5. The apparatus of claim 1, wherein the first area of the first image comprises a first composite region from the first image, and wherein the first area of the second image comprises a second composite region from the second image.

6. The apparatus of claim 5, wherein, to blend the pixels in the second area of the first image and the pixels in the second area of the second image, the at least one processor is configured to:
   perform seam blending between the first composite region and the second composite region.

7. The apparatus of claim 1, wherein the at least one processor is configured to blend the pixels in the second area of the first image and the pixels in the second area of the second image to recover the portion of the region of interest based on replacing the portion of the region of interest that does not exist in the first image with at least a part of the second image.

8. The apparatus of claim 1, wherein the first type of lens is a telephoto lens, and wherein the second type of lens is a wide-angle lens.

9. The apparatus of claim 1, wherein the first image and the second image are captured concurrently.

10. The apparatus of claim 1, wherein the first image and the second image are captured at different times.

11. A method performed by an electronic device, the method comprising:
   selecting, for a fused image, pixels from a first area of a first image obtained using a first type of lens;

selecting, for the fused image, pixels from a first area of a second image obtained using a second type of lens that is different than the first type of lens, wherein the first area of the first image and the first area of the second image are within a region of interest, wherein a portion of the region of interest is outside of the first image and is smaller than the second image, and wherein the first area of the second image obtained using the second type of lens is used to fill in a portion of the region of interest not captured in the first area of the first image obtained using the first type of lens;

blending pixels in a second area of the first image and pixels in a second area of the second image to obtain blended pixels; and including the pixels from the first area of the first image, the pixels from the first area of the second image, and the blended pixels in the fused image.

12. The method of claim 11, further comprising:
outputting the fused image.

13. The method of claim 11, wherein the second area of the first image is within the first area of the first image, and wherein the second area of the second image is within the first area of the second image.

14. The method of claim 13, wherein the second area of the first image overlaps with the second area of the second image.

15. The method of claim 11, wherein the first area of the first image comprises a first composite region from the first image, and wherein the first area of the second image comprises a second composite region from the second image.

16. The method of claim 15, wherein blending the pixels in the second area of the first image and the pixels in the second area of the second image comprises:
performing seam blending between the first composite region and the second composite region.

17. The method of claim 11, wherein blending the pixels in the second area of the first image and the pixels in the second area of the second image is performed in order to recover the portion of the region of interest based on replacing the portion of the region of interest that does not exist in the first image with at least a part of the second image.

18. The method of claim 11, wherein the first type of lens is a telephoto lens, and wherein the second type of lens is a wide-angle lens.

19. The method of claim 11, wherein the first image and the second image are captured concurrently.

20. The method of claim 11, wherein the first image and the second image are captured at different times.

\* \* \* \* \*